(12) United States Patent
Wahadaniah et al.

(10) Patent No.: US 9,967,557 B2
(45) Date of Patent: May 8, 2018

(54) VIDEO ENCODING METHOD, VIDEO ENCODING APPARATUS, VIDEO DECODING METHOD AND VIDEO DECODING APPARATUS

(71) Applicant: Panasonic Corporation, Osaka (JP)

(72) Inventors: Viktor Wahadaniah, Singapore (SG); Chong Soon Lim, Singapore (SG); Hai Wei Sun, Singapore (SG); Sue Mon Thet Naing, Singapore (SG); Takahiro Nishi, Nara (JP); Hisao Sasai, Osaka (JP); Youji Shibahara, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 398 days.

(21) Appl. No.: 14/146,028

(22) Filed: Jan. 2, 2014

(65) Prior Publication Data
US 2014/0112389 A1    Apr. 24, 2014

Related U.S. Application Data

(63) Continuation of application No. PCT/JP2012/008467, filed on Dec. 28, 2012.
(Continued)

(51) Int. Cl.
*H04N 19/25* (2014.01)
*H04N 19/463* (2014.01)
(Continued)

(52) U.S. Cl.
CPC ....... *H04N 19/00406* (2013.01); *H04N 19/25* (2014.11); *H04N 19/29* (2014.11);
(Continued)

(58) Field of Classification Search
None
See application file for complete search history.

(56) References Cited

U.S. PATENT DOCUMENTS 8,971,406 B2 *  3/2015  Wahadaniah ............ 375/240.02
9,277,219 B2 *  3/2016  Samuelsson ........... H04N 19/50
(Continued)

FOREIGN PATENT DOCUMENTS

SE    WO 2013006114 A2 *  1/2013  ....... H04N 19/00024
SE    WO 2013012372 A1 *  1/2013  ............. H04N 19/70

OTHER PUBLICATIONS

Schwartz et al., Jvt-AE011, Jul. 3 2009.*
(Continued)

*Primary Examiner* — Mohammad J Rahman
(74) *Attorney, Agent, or Firm* — Wenderoth, Lind & Ponack, L.L.P.

(57) ABSTRACT

Accordingly, a video encoding method, apparatus and other aspects are disclosed. A reference picture set is written into a header of the bit stream, the reference picture set including reference pictures, a time identifier, a usage identifier and at least one parameter representing at least one of scale and view. A reference picture list having one or more of the reference pictures is constructed. A block of the video is encoded from a reference picture associated with a reference index in the reference picture list. The reference index is written into the bit stream.

11 Claims, 25 Drawing Sheets

Related U.S. Application Data

(60) Provisional application No. 61/584,847, filed on Jan. 10, 2012.

(51) Int. Cl.
    *H04N 19/597* (2014.01)
    *H04N 19/29* (2014.01)
    *H04N 19/44* (2014.01)
    *H04N 19/31* (2014.01)
    *H04N 19/503* (2014.01)
    *H04N 19/46* (2014.01)

(52) U.S. Cl.
    CPC .............. *H04N 19/31* (2014.11); *H04N 19/44* (2014.11); *H04N 19/46* (2014.11); *H04N 19/463* (2014.11); *H04N 19/503* (2014.11); *H04N 19/597* (2014.11)

(56) References Cited

U.S. PATENT DOCUMENTS

| | | | | |
|---|---|---|---|---|
| 2004/0151248 A1* | 8/2004 | Kondo | H04N 19/00018 | 375/240.16 |
| 2005/0152452 A1* | 7/2005 | Suzuki | H04N 19/176 | 375/240.16 |
| 2008/0285652 A1* | 11/2008 | Oxman | H04N 19/61 | 375/240.16 |
| 2009/0279608 A1* | 11/2009 | Jeon | H04N 19/597 | 375/240.16 |
| 2009/0279612 A1* | 11/2009 | Pandit | H04N 19/597 | 375/240.25 |
| 2010/0046619 A1* | 2/2010 | Koo | H04N 19/597 | 375/240.12 |
| 2010/0135391 A1* | 6/2010 | Tian | H04N 19/597 | 375/240.12 |
| 2010/0165077 A1* | 7/2010 | Yin | H04N 19/597 | 348/42 |
| 2011/0096835 A1* | 4/2011 | Lim | H04N 19/597 | 375/240.12 |
| 2011/0221861 A1* | 9/2011 | Jeon | H04N 13/0022 | 348/42 |
| 2013/0058408 A1* | 3/2013 | Wahadaniah | H04N 19/70 | 375/240.12 |
| 2013/0064284 A1* | 3/2013 | Samuelsson | H04N 19/70 | 375/240.01 |
| 2013/0070841 A1* | 3/2013 | Wahadaniah | H04N 19/115 | 375/240.02 |
| 2013/0077687 A1* | 3/2013 | Wang | H04N 19/105 | 375/240.15 |
| 2013/0101034 A1* | 4/2013 | Wahadaniah | H04N 19/70 | 375/240.12 |
| 2013/0101038 A1* | 4/2013 | Shimizu | H04N 19/00569 | 375/240.12 |
| 2013/0128977 A1* | 5/2013 | Yu | H04N 19/00575 | 375/240.16 |
| 2013/0155184 A1* | 6/2013 | Chen | H04N 19/00569 | 348/43 |
| 2013/0229485 A1* | 9/2013 | Rusanovskyy | H04N 13/0048 | 348/43 |
| 2013/0266069 A1* | 10/2013 | Sugio | H04N 19/00721 | 375/240.15 |
| 2014/0079119 A1* | 3/2014 | Samuelsson | H04N 19/50 | 375/240.12 |
| 2014/0126640 A1* | 5/2014 | Samuelsson | H04N 19/00515 | 375/240.16 |
| 2014/0169449 A1* | 6/2014 | Samuelsson | H04N 19/00024 | 375/240.02 |
| 2014/0233653 A1* | 8/2014 | Samuelsson | H04N 19/52 | 375/240.16 |
| 2014/0334556 A1* | 11/2014 | Shibahara | H04N 19/44 | 375/240.27 |

OTHER PUBLICATIONS

International Search Report dated Apr. 9, 2013 in International (PCT) Application No. PCT/JP2012/008467.

Written Opinion of the International Searching Authority dated Apr. 9, 2013 in International (PCT) Application No. PCT/JP2012/008467.

Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d3, 7th Meeting: Geneva, CH, Nov. 21-30, 2011.

"Advanced video coding for generic audiovisual services", ITU-T Recommendation H. 264, Mar. 2010.

Rickard Sjoberg, Jonatan Samuelsson, "Absolute signaling of reference pictures", Joint Collaborative Team on Video Coding (JCT-VC) of ITU-T SG16 WP3 and ISO/IEC JTC1/SC29/WG11 6th Meeting: Torino, Jul. 22, 2011, [JCTVCF493].

Rickard Sjoberg, David Flynn, Ying Chen, TK Tan, Wade K. Wan, "JCT-VC AHG report: Reference picture buffering and list construction (AHG21)", Join t Collabrative Team on Video Coding (JCT-VC) of ITU-T SG16 WP3 and ISO/IEC JTC1/SC29/WG11 7th Meeting: Geneva, CH, Nov. 21-30, 2011, [JCTVC-G021].

Gary Sullivan, Yongjun Wu, Jizheng Xu, Bin Li, "Proposal on Decoded Picture Buffer Description Syntax Relating to AHG21 and JCTVC-F493", Joint Collaborative Team on Video Coding (JCT-VC) of ITU-T SG16 WP3 and ISO/IEC JTC1/SC29/WG11 7th Meeting: Geneva, CH, Nov. 21-30, 2011, [JCTVC-G788_r1].

Kiran Misra, Sachin Deshpande, Louis Kerofsky, Andrew Segall, "AHG18/21: Absolute signaling for resolution switching", Joint Collaborative Team on Video Coding (JCT-VC) of ITU-T SG16 WP3 and ISO/IEC JTC1/SC29/WG11 7th Meeting: Geneva, CH, Nov. 21-30, 2011, [JCTVC-G715].

* cited by examiner

FIG. 2

Buffer description
max_num_ref_frames = 4

|  | BE0 | BE1 | BE2 | BE3 |
|---|---|---|---|---|
| POC | 4 | 9 | 6 | 10 |
| UsageFlag | 0 | 1 | 1 | 0 |

Prior Art

FIG. 3

Buffer description
max_num_ref_frames = 4

|  | BE0 | BE1 | BE2 | BE3 |
|---|---|---|---|---|
| POC | 4 | 9 | 6 | 6 |
| UsageFlag | 0 | 1 | 1 | 1 |
| BasePicFlag | 0 | 0 | 0 | 1 |

FIG. 4

Buffer description
max_num_ref_frames = 4

|  | BE0 | BE1 | BE2 | BE3 |
|---|---|---|---|---|
| POC | 4 | 9 | 9 | 9 |
| UsageFlag | 0 | 1 | 1 | 1 |
| ViewID | 0 | 0 | 1 | 2 |

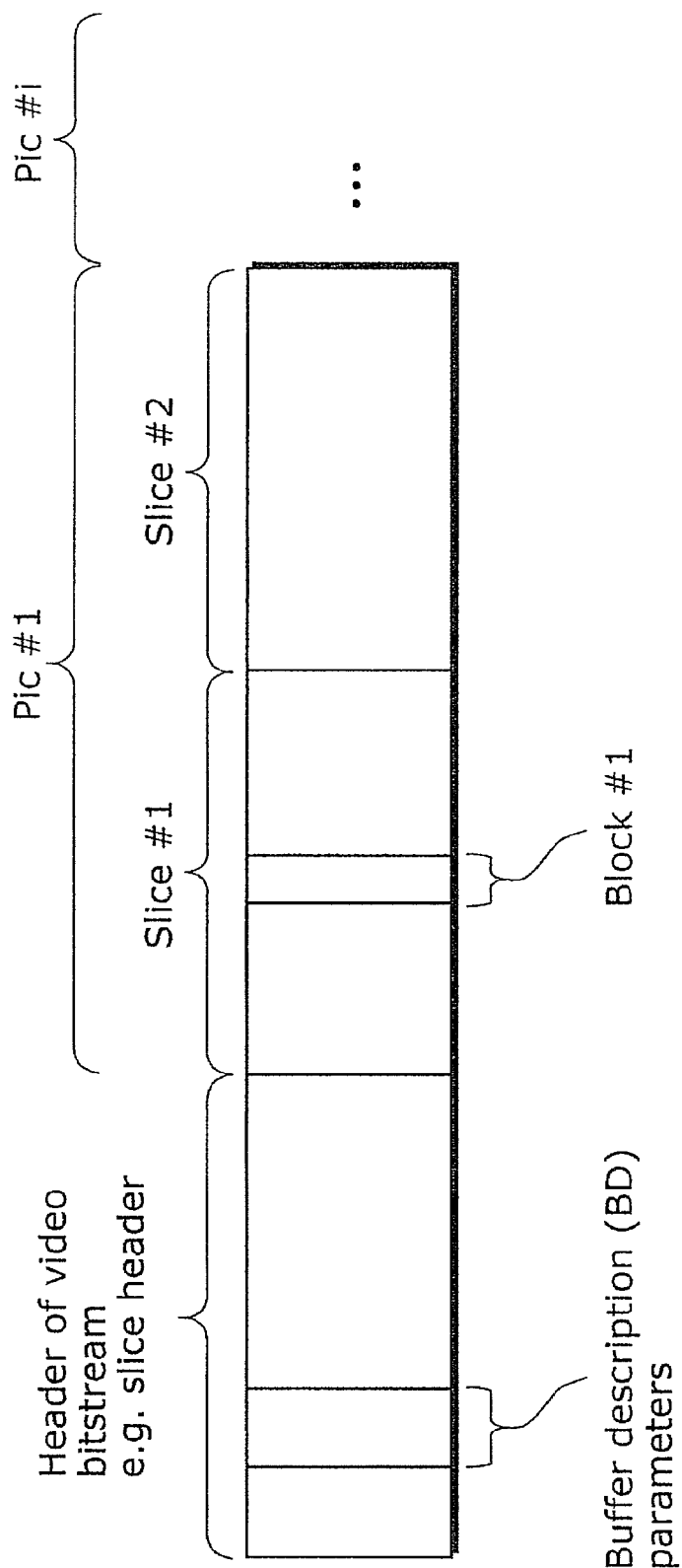

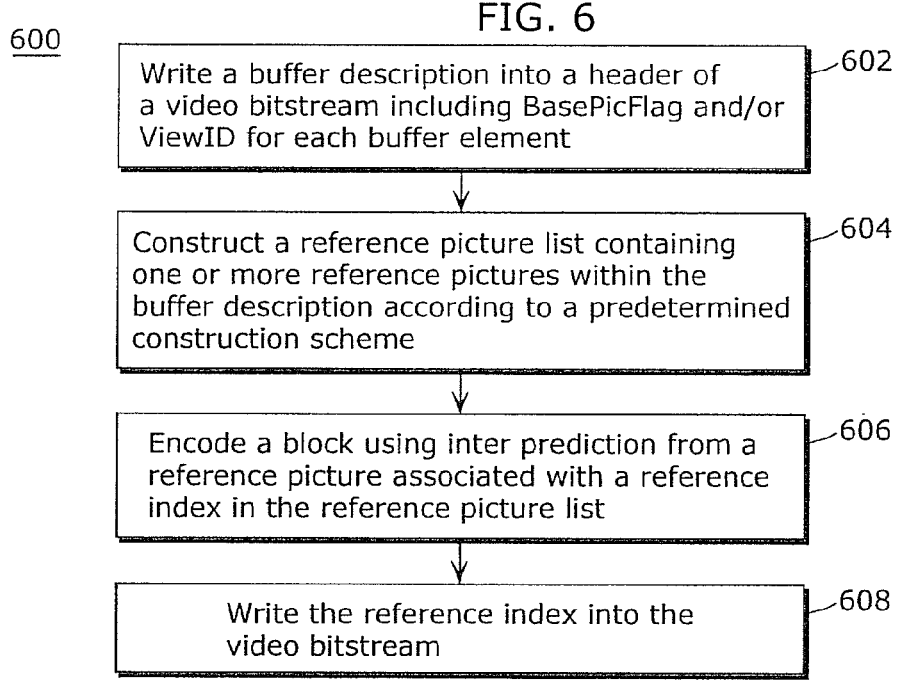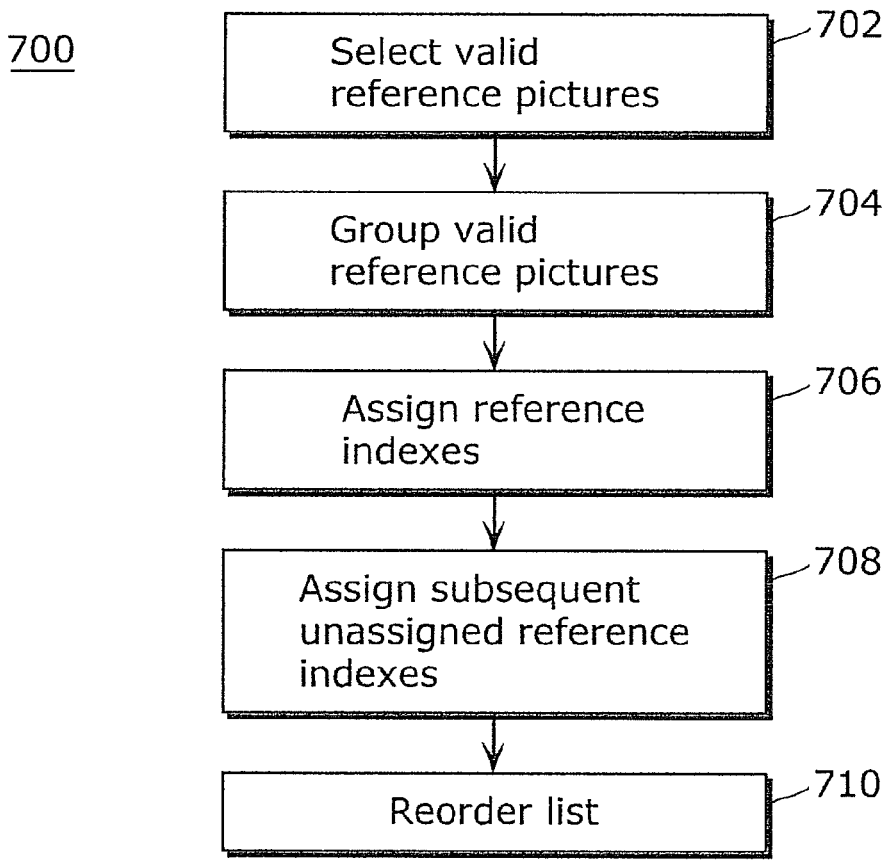

FIG. 19
Stream of TS packets
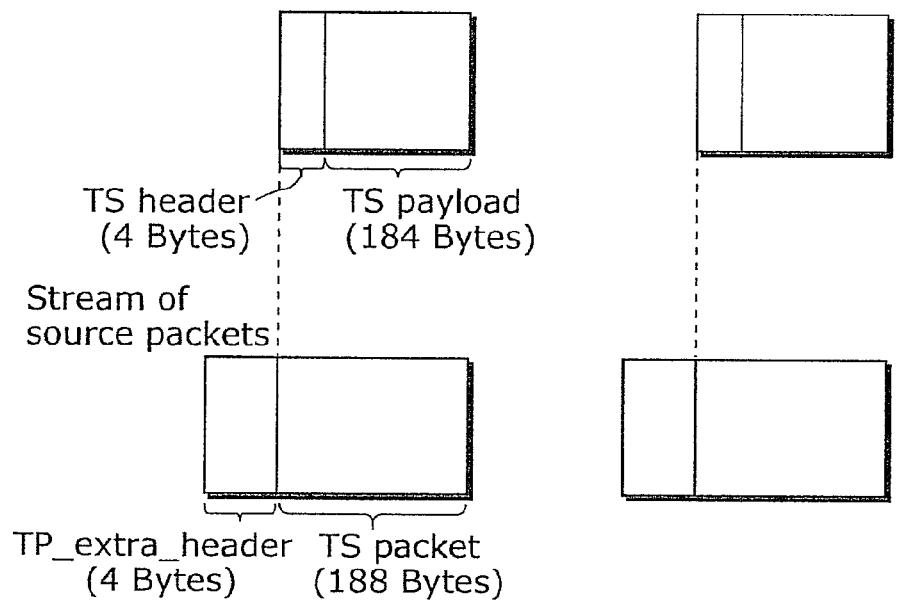
TS header (4 Bytes)   TS payload (184 Bytes)
Stream of source packets
TP_extra_header (4 Bytes)   TS packet (188 Bytes)
Multiplexed data
SPN 0 1 2 3 4 5 6 7 ...
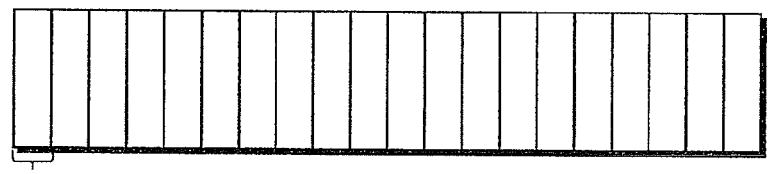
Source packet

| Corresponding standard | Driving frequency |
|---|---|
| MPEG-4 AVC | 500 MHz |
| MPEG-2 | 350 MHz |
| ⋮ | ⋮ | ures may be present in more than one entry in a reference
VIDEO ENCODING METHOD, VIDEO ENCODING APPARATUS, VIDEO DECODING METHOD AND VIDEO DECODING APPARATUS

CROSS REFERENCE TO RELATED APPLICATIONS

This is a continuation application of PCT International Application No. PCT/JP2012/008467 filed on Dec. 28, 2012, designating the United States of America, which is based on and claims priority of U.S. Provisional Patent Application No. 61/584,847 filed on Jan. 10, 2012. The entire disclosures of the above-identified applications, including the specifications, drawings and claims are incorporated herein by reference in their entirety.

FIELD

One or more exemplary embodiments disclosed herein relate generally to the coding and decoding of video data.

BACKGROUND

A commonly used technical Standard for video coding is known as H.264 (see Non Patent Literature (NPL) 1). The H.264 Standard includes a coded picture buffer (CPB) and a decoded picture buffer (DPB). The CPB is a first-in first-out buffer containing access units in decoding order specified in a decoder. The DPB is a buffer holding decoded pictures for reference, output reordering, or output delay specified for the decoder. The H.264 Standard uses an approach whereby one of two schemes that specifies which reference pictures are to be removed from the DPB. The first scheme ("sliding window reference picture marking") specifies a first-in first-out mechanism for marking reference pictures as "unused for reference". The second scheme ("adaptive reference picture marking") relies on specific syntax elements in the video bit stream to specify the marking of selected reference picture(s) as "unused for reference".

There is in development a draft Standard on high-efficiency video coding (HEVC), known as ITU-T SG16 WP3 and also known as ISO/IEC JTC1/SC29/WG11. A buffer description (BD) (also known as a reference picture set (RPS)) has been proposed. The BD describes the available reference pictures in the DPB at the start of the encoding/decoding process of a target picture. The basic concept of the BD is to signal information for keeping/retaining reference pictures in the DPB.

More particularly, the BD is a list of all reference pictures that are stored in the DPB. Each item (corresponding to one reference picture) in this list is referred to as a buffer element (BE). A BE comprises a unique picture identifier such as a picture order count (POC) number and additional picture information such as a usage flag indicating the temporal layer/level of the picture. The usage flag indicates whether or not a reference picture is used in inter-picture prediction coding of a current picture. When a reference picture is not used, it remains in the DPB and may be used in inter-prediction coding of future pictures following the current picture in coding order. Inclusion of the usage flag in the BD is useful for error robustness, as the flag is required in constructing reference picture list(s). If a reference picture is lost (e.g. due to transmission errors), reference picture lists of subsequent pictures can still be constructed as intended by the encoder.

A BD is activated and applied at the start of the encoding/decoding process of a target picture. Pictures in the DPB that are not included in the active BD are considered as non-reference pictures and are marked as "unused for reference". The pictures marked as "unused for reference" may still be kept in the DPB for a bumping scheme such as the scheme specified in the AVC video coding scheme.

The bumping scheme removes/deletes pictures from DPB. Even when a picture is not a reference picture, they may need to be kept in the DPB until its output/display time instance.

A reference picture list is constructed for encoding/decoding a target picture. Each entry in the reference picture list is identified using a reference index. In H.264 and HEVC provides the flexibility where not all valid reference pictures are listed in a reference picture list and a valid reference picture may be present in more than one entry in a reference picture list.

CITATION LIST

Patent Literature

[NPL 1] ITU-TRecommendation H.264, Advanced video coding for generic audiovisual services, March 2010.

SUMMARY

Technical Problem

One non-limiting and exemplary embodiment provides expanding/extending the use of the BD, for example, into scalable and multi-view extensions of the HEVC scheme. In broad terms, an aspect of the present disclosure provides at least one additional parameter in the BD.

Solution to Problem

In one general aspect, the techniques disclosed here feature a video encoding method including: writing a reference picture set into a header of the bit stream, the reference picture set including a reference identifier of reference pictures, a time identifier, a usage identifier and at least one parameter representing at least one of scale and view; constructing a reference picture list having one or more of the reference pictures; encoding a block of the video from a reference picture associated with a reference index in the reference picture list; and writing the reference index into the bit stream.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A video encoding method, a video encoding apparatus, a video decoding method, and a video decoding apparatus according to one or more exemplary embodiments or features disclosed herein successfully achieve expansion or extension of the use of the buffer description.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 shows a known buffer description.

FIG. 3 is a BD according to one embodiment.

FIG. 4 is a BD according to another embodiment.

FIG. 5 shows a data structure syntax for an output data stream.

FIG. 6 is a block flow diagram of an encoding process in one embodiment.

FIG. 7 is a block flow diagram of the construction of a reference picture list.

FIG. 19 shows a structure of TS packets and source packets in the multiplexed data.

DESCRIPTION OF EMBODIMENTS

Accordingly, a video encoding method is disclosed. A reference picture set is written into a header of the bit stream, the reference picture set including a reference identifier of reference pictures, a time identifier, a usage identifier and at least one parameter representing at least one of scale and view. A reference picture list having one or more of the reference pictures is constructed. A block of the video is encoded from a reference picture associated with a reference index in the reference picture list. The reference index is written into the bit stream.

The scale parameter can be at least one of resolution, time and quality. The scale parameter can have a 0 or 1 binary value, or an integer value larger than or equal to 0. The view parameter can have integer values greater than or equal to 0.

A video encoding circuit/apparatus also is disclosed. The apparatus includes a circuit configured to write a reference picture set into a header of the bit stream, the reference picture set including a reference identifier of reference pictures, a time identifier, a usage identifier and at least one parameter representing at least one of scale and view, a circuit configured to construct a reference picture list having one or more of the reference pictures, a circuit configured to encode a block of the video from a reference picture associated with a reference index in the reference picture list, and a circuit configured to write the reference index into the bit stream.

A computer program product is further disclosed. The product includes a storage medium and a computer program. The computer program is configured to execute writing a reference picture set into a header of the bit stream, the reference picture set including a reference identifier of reference pictures, a time identifier, a usage identifier and at least one parameter representing at least one of scale and view, constructing a reference picture list having one or more of the reference pictures, encoding a block of the video from a reference picture associated with a reference index in the reference picture list, and writing the reference index into the bit stream.

A data structure is further disclosed, comprising a time identifier, a usage identifier, and at least one parameter representing at least one of scale and view.

A disclosed encoded video signal includes at least one parameter representing at least one of scale and view.

Embodiment 1

Figure 1:
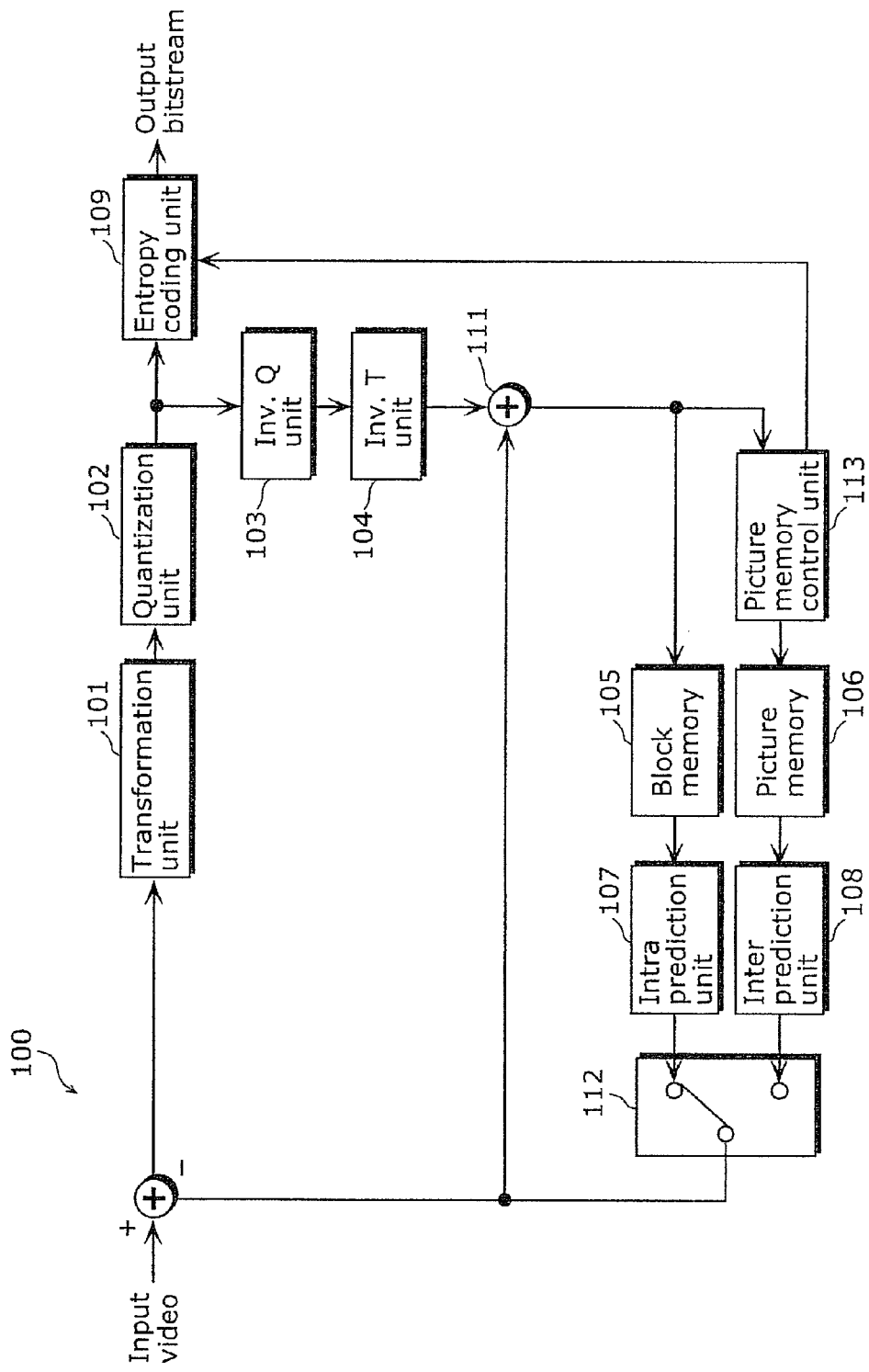
FIG. 1 is a block diagram which shows a structure of a video/image encoding apparatus.

FIG. 1 is a block diagram which shows a structure of video/image encoding apparatus 100. The video/image encoding apparatus 100 is an apparatus for encoding an input video/image bit stream on a block-by-block basis so as to generate an encoded output bit stream. As shown in FIG. 1, the apparatus 100 includes a transformation unit 101, a quantization unit 102, an inverse quantization (inv. Q) unit 103, an inverse transformation (inv. T) unit 104, a block memory 105, a picture memory 106, an intra prediction unit 107, an inter prediction unit 108, an entropy coding unit 109, an adder 111, a switch 112 and a picture memory control unit 113.

An input video is inputted to an adder, which outputs added values to the transformation unit 101. The transformation unit 101 transforms the added values into frequency coefficients, and outputs the resulting frequency coefficients to the quantization unit 102. The quantization unit 102 quantizes the inputted frequency coefficients, and outputs the resulting quantized values to the inverse quantization unit 103 and the entropy coding unit 109. The entropy coding unit 109 encodes the quantized values outputted from the quantization unit 102, and outputs a bit stream.

The inverse quantization unit 103 inversely quantizes the sample values outputted from the quantization unit 102, and outputs the frequency coefficients to the inverse transformation unit 104. The inverse transformation unit 104 performs inverse frequency transform on the frequency coefficients so as to transform the frequency coefficients into sample values of the bit stream, and outputs to the adder 111. The adder 111 adds the sample values of the bit stream outputted from the inverse transformation unit 104 to the predicted video/image values outputted from the inter/intra prediction unit 107, 108 (via the switch 112, and outputs the resulting added values to the block memory 105 or the picture memory 106 for further prediction. The inter/intra prediction unit 107, 108 searches within reconstructed videos/images stored in the block memory 105 or the picture memory 106, and estimates a video/image area which is e.g. most similar to the input videos/images for prediction.

The picture memory control unit 113 manages reference pictures including making decision and marking a picture in the picture memory 106 (DPB) as reference or non-reference picture, constructing reference picture list(s), bumping/removing pictures from the picture memory 106. Furthermore, the picture memory control unit 113 constructs the reference picture list(s), and sends signals to the entropy coding unit 109 to write buffer description parameters into the output bit stream, including at least one of the base picture flag and the view identifier.

FIG. 2 shows a known BD 200 for the case where the maximum number of reference frames=4, equating to four buffer entries BE0, BE1, BE2 and BE3. The POC for each BE, and a corresponding UsageFlag. The POC value is a time identifier. The UsageFlag value represents usage and takes a value of 0 or 1, respectively corresponding to "used" or "stored".

FIG. 3 is a BD 300 according to one embodiment. Each BD includes a further parameter, in the form of the BasePicFlag. The BasePicFlag uniquely identifies one out of two versions of a reference picture having the same POC. The BasePicFlag parameter is used for scalable coding, as either 1="base" coding, and 0="enhanced" coding. The scalability can be in terms of at least resolution, time or quality.

FIG. 4 is a BD 400 according to another embodiment. Each BE includes a further parameter, in the form of ViewID. The ViewID uniquely identifies one out of multiple view components having the same POC. The (integer) ViewID parameter is used for multi-view coding, where 0="base"/1st view, 1=2nd view and 2=3rd view. Other forms of parameter will be apparent to those skilled in the art, with the underlying idea being the inclusion of additional information in a BD to distinguish between reference pictures sharing the same time instance/identifier (e.g., POCs).

FIG. 5 shows a data structure syntax for a video bit stream. A frame consists of a Header and a Picture (Pic #1). The picture block is formed of two picture slices (Slice #1 and Slice #2). A block (Block #i) within each Slice #i is coded using inter-prediction from a unique reference picture (e.g., BE2 in the BD). BE2 is identified by a reference index within the bits associated with block #i. The BD parameters (e.g., BE0 to BE3) exist within the Header.

The BD is signaled in the header of a video bit stream, for example in the sequence parameter set (SPS), the picture parameter set (PPS), the adaptation parameter set (APS) or the slice header (SH). HEVC supports signaling a plurality of periodic BDs in the PPS, and refers to a periodic BD in a number of slices.

Referring now to FIG. 6, an encoding process 600 begins, in step 602, with writing a buffer description into a header of a video bit stream including the parameters BasePicFlag and/or ViewID for each buffer element. In step 604, a reference picture list is constructed containing one or more reference pictures within the buffer description according to a predetermined construction scheme. Next, in step 606, a block is encoded using inter-prediction from a reference picture associated with a reference index in the reference picture list. Lastly, in step 608, the reference index is written into the video bit stream. A reference index uniquely identifies a reference picture in the picture memory 805 of the decoder (see FIG. 8 below).

FIG. 7 is a flow chart of a process 700 of constructing a reference picture list (i.e., step 604 in FIG. 6, and step 902 in FIG. 9 below). In step 702, a plurality of valid reference pictures are selected from among all reference pictures within BD/RPS based on a UseBasePicFlag parameter of a current slice/picture.

(UseBasePicFlag specifies whether a target picture to be encoded/decoded references previously encoded/decoded base pictures or enhanced pictures.) If UseBasePicFlag is equal to 1, a reference picture having BasePicFlag equal to 0 is considered as not valid. Otherwise (UseBasePicFlag is equal to 0), a reference picture having BasePicFlag equal to 1 is considered as not valid. The valid reference pictures are grouped, in step 704, into subsets whereas each subset comprises valid reference pictures having a same ViewID. The reference picture list is constructed as an ordered list of valid reference pictures. In step 706 reference indexes are assigned in ascending order (starting from 0) to reference pictures within the subset having the same ViewID as the current slice/picture, according to the order of increasing POC distance to the current slice/picture(*). Then, in step 708, subsequent unassigned reference indexes are assigned in ascending order to reference pictures within the remaining subsets, starting from the subset having a smallest ViewID to the subset having a largest ViewID. Reference pictures within each subset are assigned reference indexes according to the order of increasing POC distance to the current slice/picture with. Other embodiments of the process may be designed dependent upon the 'parameter/s' involved. For example, the BasePicFlag parameter can be used in the grouping step 704. The ViewID and/or BasePicFlag parameters also can be used in the selecting valid reference pictures.

Steps 702 to 708 produce an initial reference picture list. An encoder may optionally, in step 710, signal in the video bit stream to reorder the initial reference picture list. Using such signals, a decoder can perform the same reordering process.

In AVC and current HEVC, up to two reference picture lists (e.g. termed "List0" and "List1") are used in encoding/decoding process of a current slice/picture. List0 is arranged such that the reference pictures having smaller POC (i.e. earlier in time) than current slice/picture are placed on top of the reference picture list, then the remaining reference pictures having larger POC (i.e. later in time) than current slice/picture are appended to the end of the list. List1 is arranged in the opposite manner, i.e. larger POCs first, followed by smaller POCs.

An effect of an embodiment of the present disclosure is in the form of extensibility/adaptability of the use of BD, for example, into scalable and multi-view extensions of the HEVC scheme. In broad terms, at least one additional parameter is provided in the BD. The additional parameter allows a reference picture in the frame memory (DPB) to be uniquely identified in the BD and subsequently used in the inter prediction process. Without the additional parameter, a means for uniquely identifying reference pictures is not available.

Embodiment 2

Figure 8:
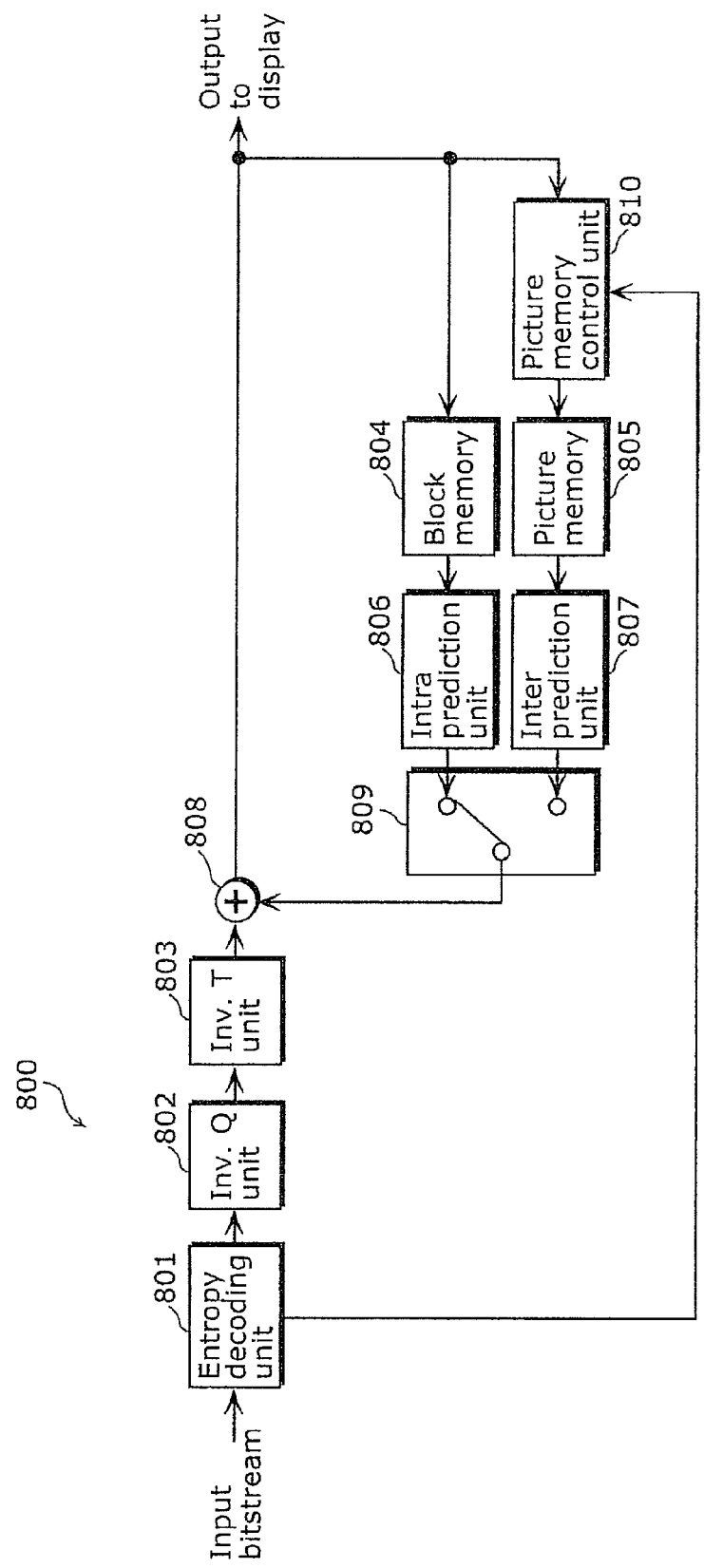
FIG. 8 is a block diagram which shows a structure of video/image decoding apparatus.

FIG. 8 is a block diagram which shows a structure of video/image decoding apparatus 800 in an embodiment of the present disclosure. The video/image decoding apparatus 800 is an apparatus for decoding an input coded bit stream on a block-by-block basis and outputting videos/images, and comprises, as shown in FIG. 8, an entropy decoding unit 801, an inverse quantization (inv. Q) unit 802, an inverse transformation (inv. T) unit 803, an block memory 804, a picture memory 805, an intra prediction unit 806, an inter prediction unit 807, an adder 808, a switch 809 and a picture memory control unit 810.

An input encoded bit stream is inputted to the entropy decoding unit 801. After the input encoded bit stream is inputted to the entropy decoding unit 801, the entropy decoding unit 801 decodes the input encoded bit stream, and outputs the decoded values to the inverse quantization unit 802. The inverse quantization unit 802 inversely quantizes the decoded values, and outputs frequency coefficients to the inverse transformation unit 803. The inverse transformation unit 803 performs inverse frequency transform on the frequency coefficients to transform the frequency coefficients into sample values, and outputs the resulting pixel values to the adder 808. The adder 808 adds the resulting pixel values to the predicted video/image values outputted from the intra/inter prediction unit 806, 807, via the switch 809, and outputs the resulting values to display, and outputs the resulting values to the block memory 804 or the picture memory 805 for further prediction. In addition, the intra/inter prediction unit 806, 807 searches within videos/images stored in the block memory 804 or picture memory 805, and estimates a video/image area which is e.g. most similar to the decoded videos/images for prediction.

The picture memory control unit 810 parses the buffer description parameters from the input bit stream to identify and manage the reference pictures, including a base picture flag or view identifier, and constructs an initial reference picture list. The picture memory control unit 810 also manages reference pictures, including marking pictures in the picture memory 805 (DPB) as reference or non-reference, bumping/removing pictures from the picture memory 805 and constructs reference picture list(s).

Figure 9:
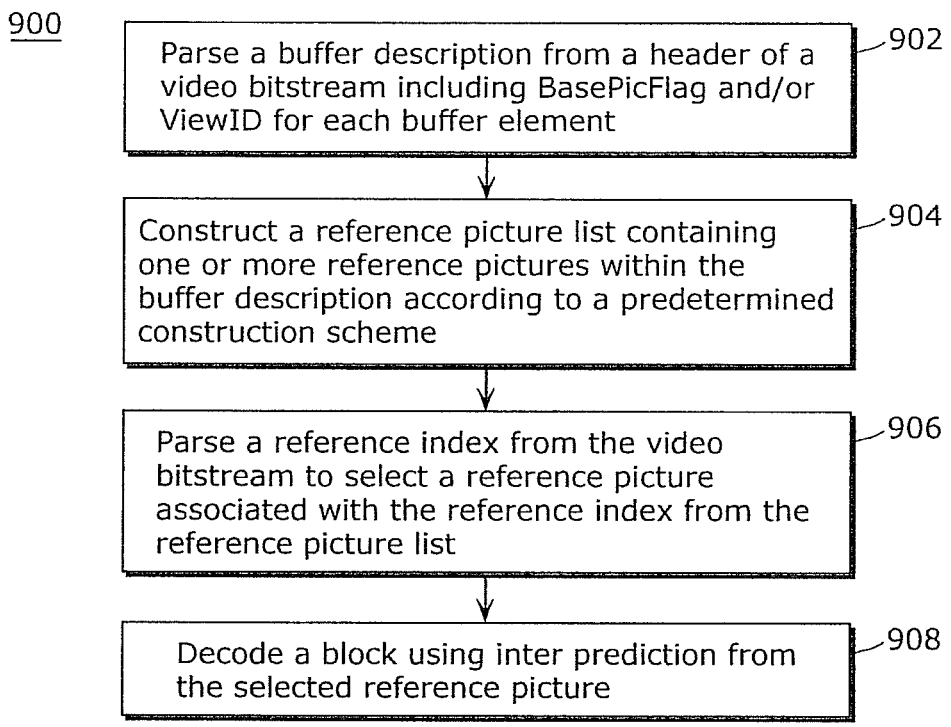
FIG. 9 is a block flow diagram of a decoding process in one embodiment.

FIG. 9 is a flow chart of a decoding process 900. In step 902, a buffer description is parsed from a header of a video bit stream that includes BasePicFlag and/or ViewID for each buffer element. In step 904, a reference picture list is constructed containing one or more reference pictures within the buffer description according to a predetermined construction scheme (e.g., the process 700 of FIG. 7). Next, in step 906, a reference index is parsed from the video bit stream to select a reference picture associated with the reference index from the reference picture list. Lastly, in step 908, a block is decoded using inter-prediction from the selected reference picture.

An effect of an embodiment of the present disclosure is to enable the decoding of a video data that is coded using extended/expanded BD. The additional parameter allows a reference picture in the frame memory (DPB) to be uniquely identified in the BD and subsequently used in the inter prediction process. Without the additional parameter, a means for uniquely identifying reference pictures is not available.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 10:
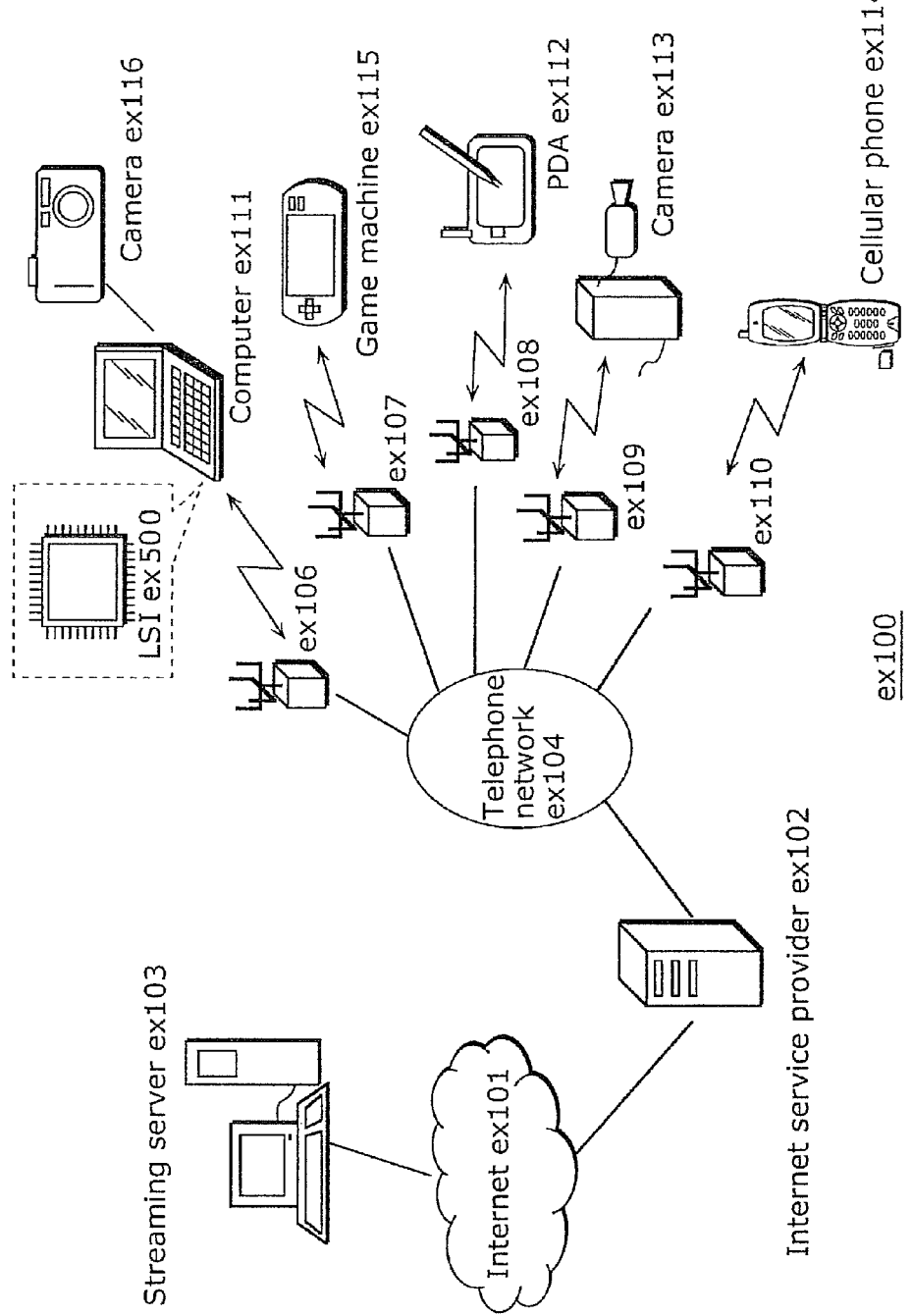
FIG. 10 shows an overall configuration of a content providing system for implementing content distribution services.

FIG. 10 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 10, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 11:
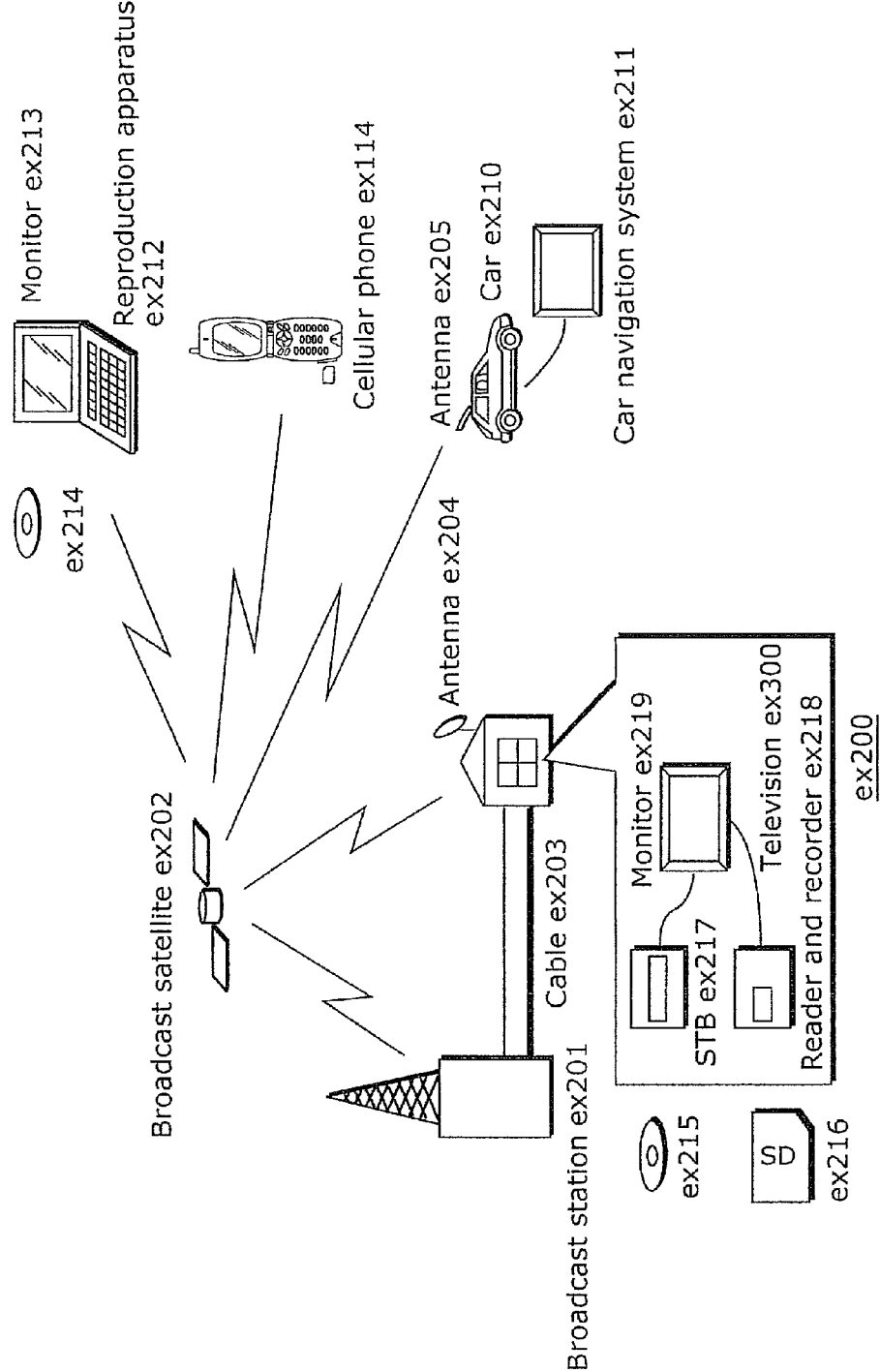
FIG. 11 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 11. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves.

Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 12:
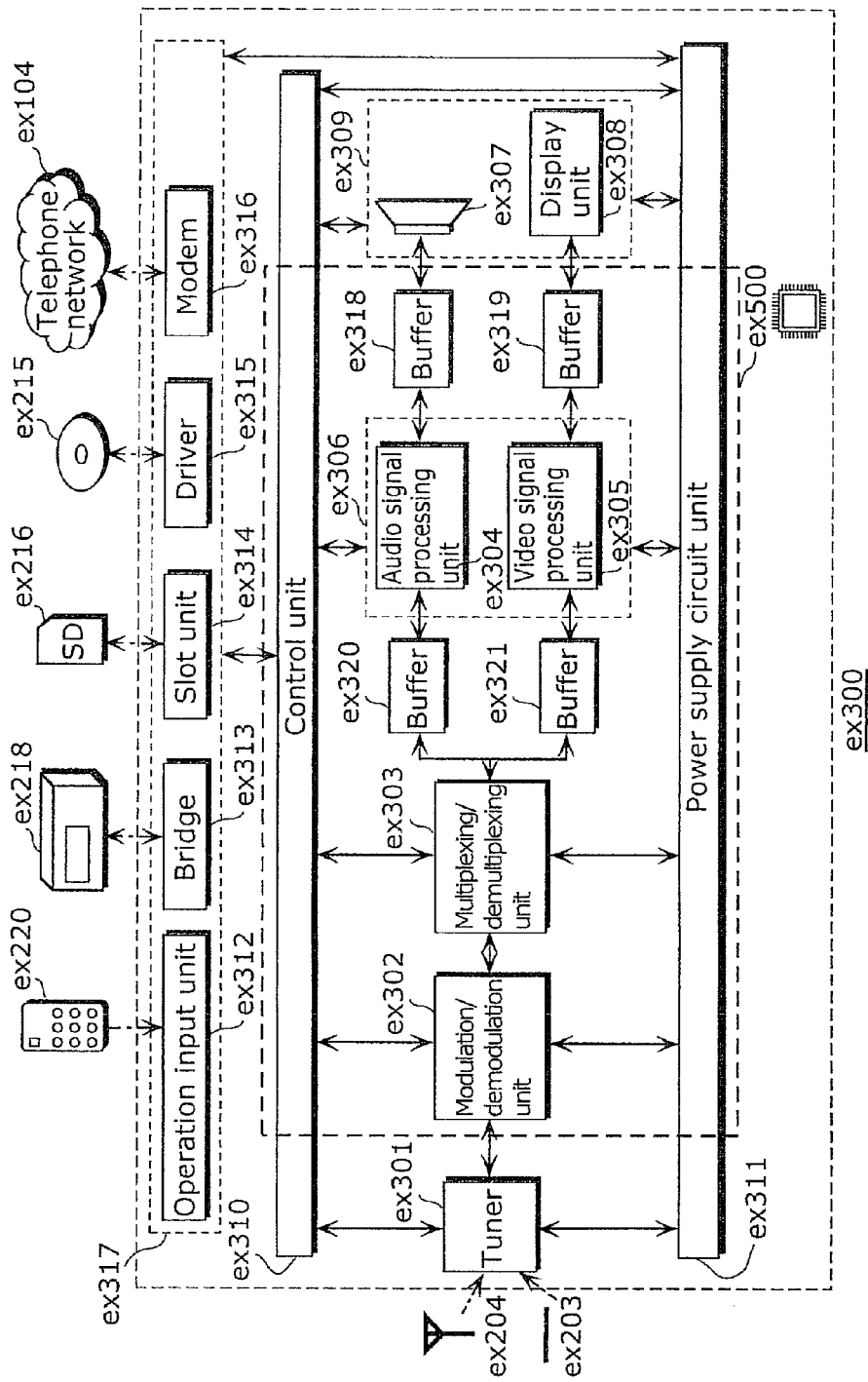
FIG. 12 shows a block diagram illustrating an example of a configuration of a television.

FIG. 12 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 13:
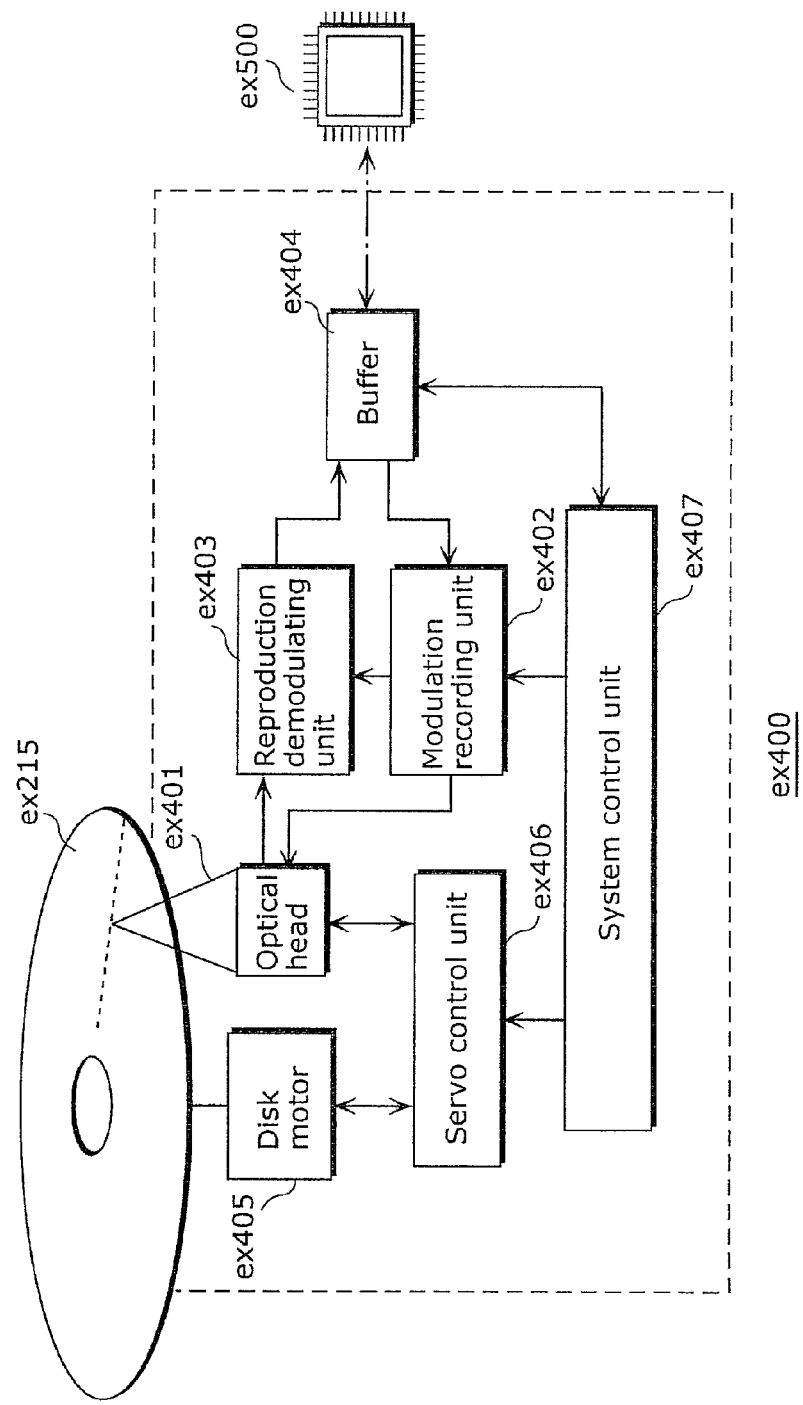
FIG. 13 shows a block diagram illustrating an example of a configuration of an information reproducing/recording unit that reads and writes information from and on a recording medium that is an optical disk.

As an example, FIG. 13 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 14:
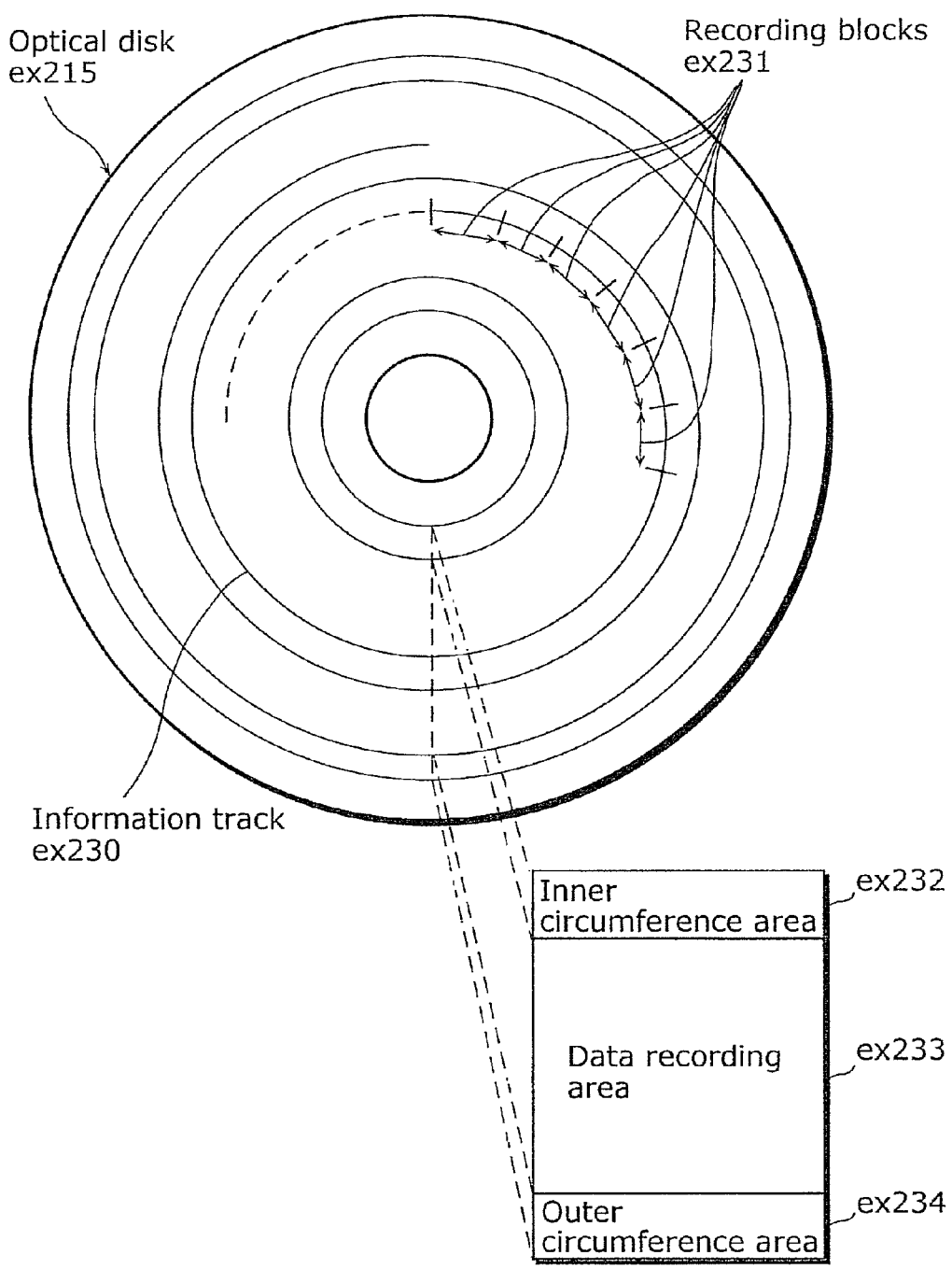
FIG. 14 shows an example of a configuration of a recording medium that is an optical disk.

FIG. 14 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 12. The same will be true for the configuration of the computer ex111, the cellular phone ex114, and others.

Figure 15A:
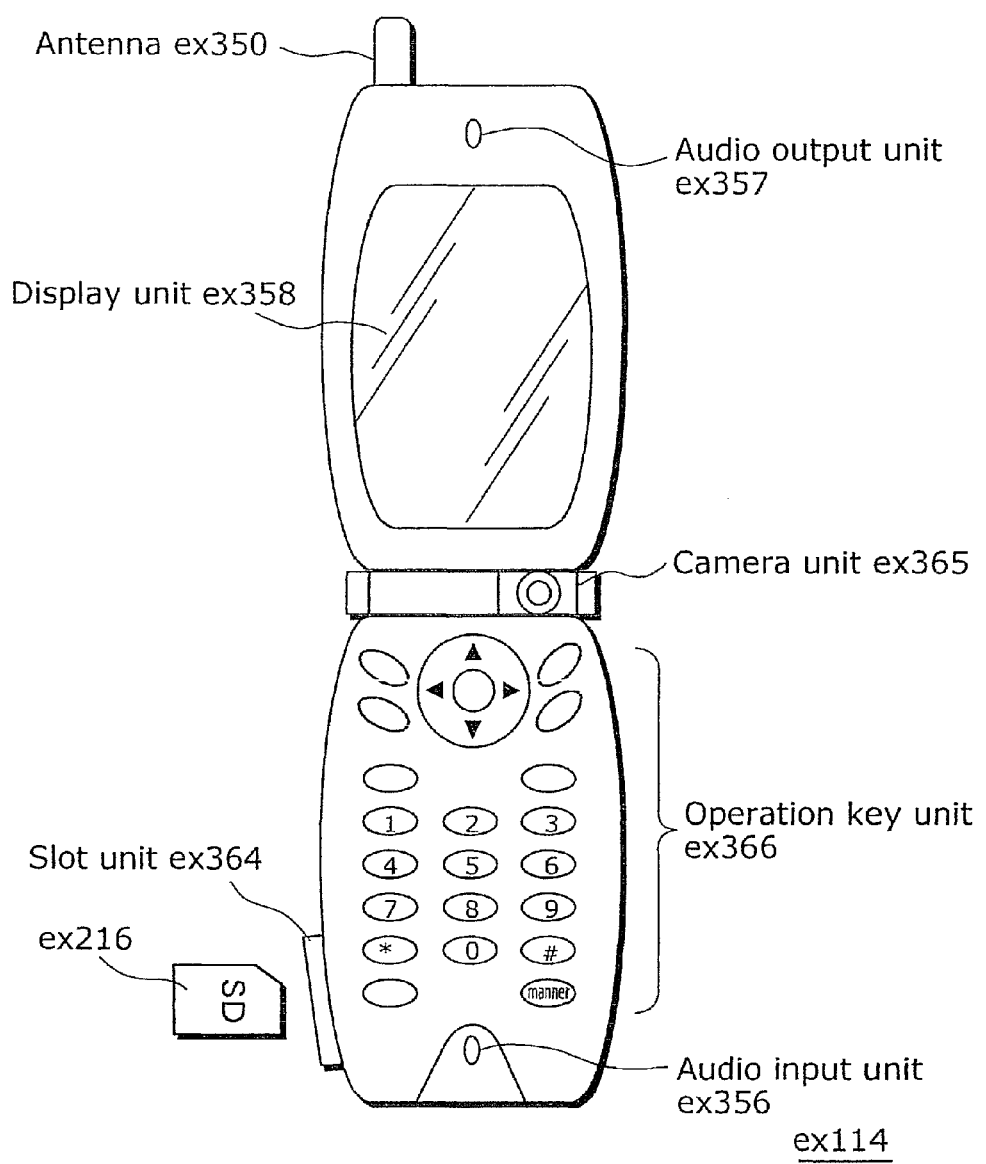
FIG. 15A shows an example of a cellular phone.

FIG. 15A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 15B:
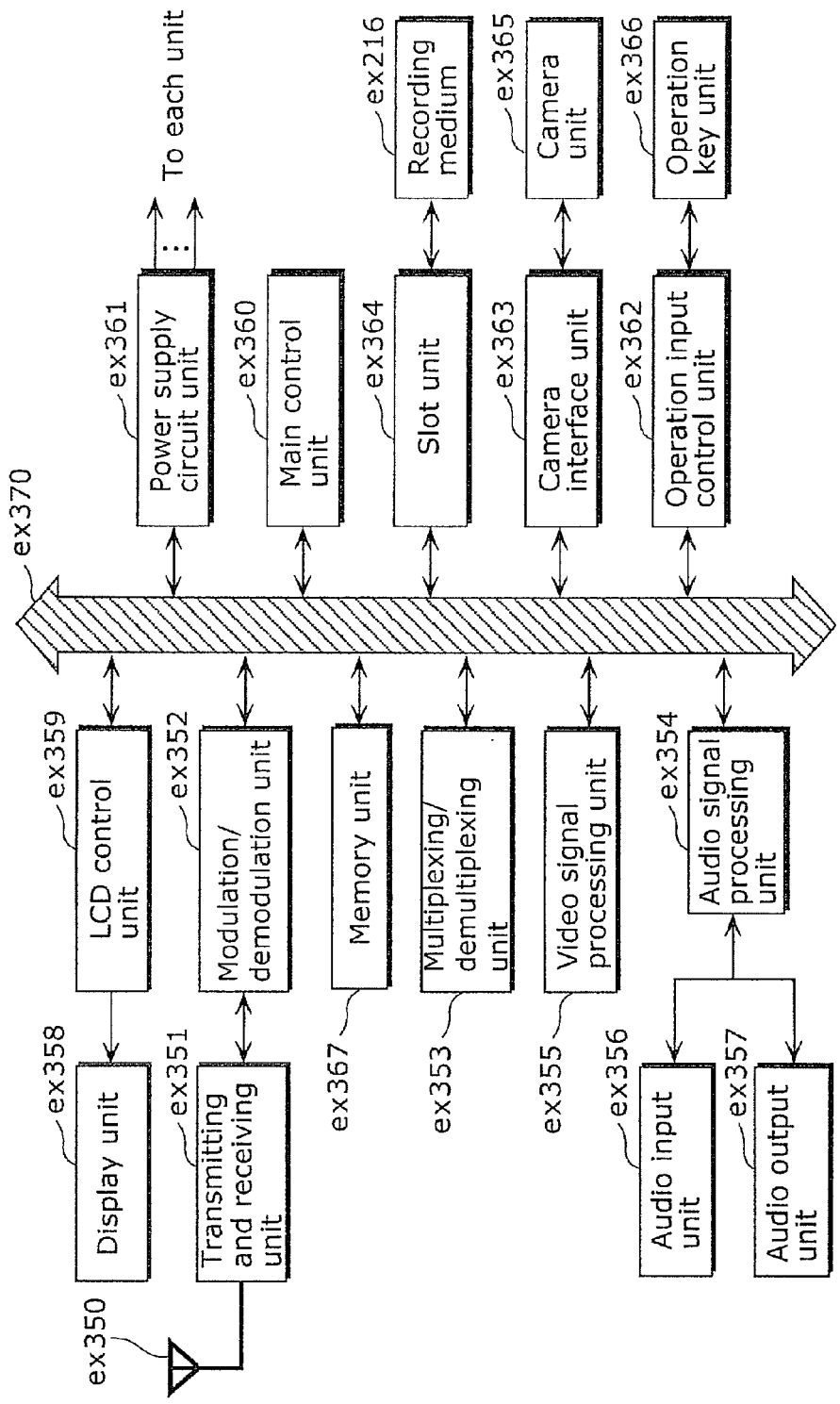
FIG. 15B is a block diagram showing an example of a configuration of a cellular phone.

Next, an example of a configuration of the cellular phone ex114 will be described with reference to FIG. 15B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 16:
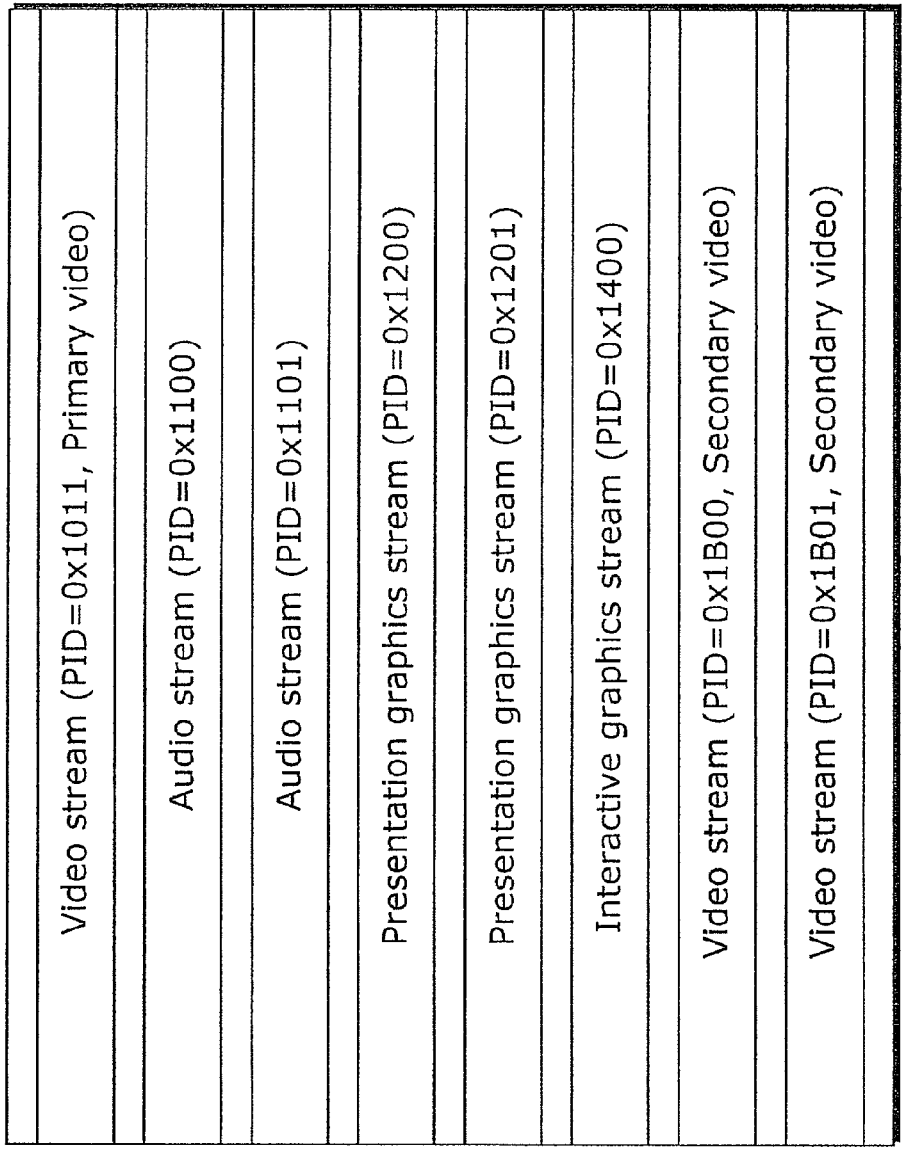
FIG. 16 illustrates a structure of multiplexed data.

FIG. 16 illustrates a structure of the multiplexed data. As illustrated in FIG. 16, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 17:
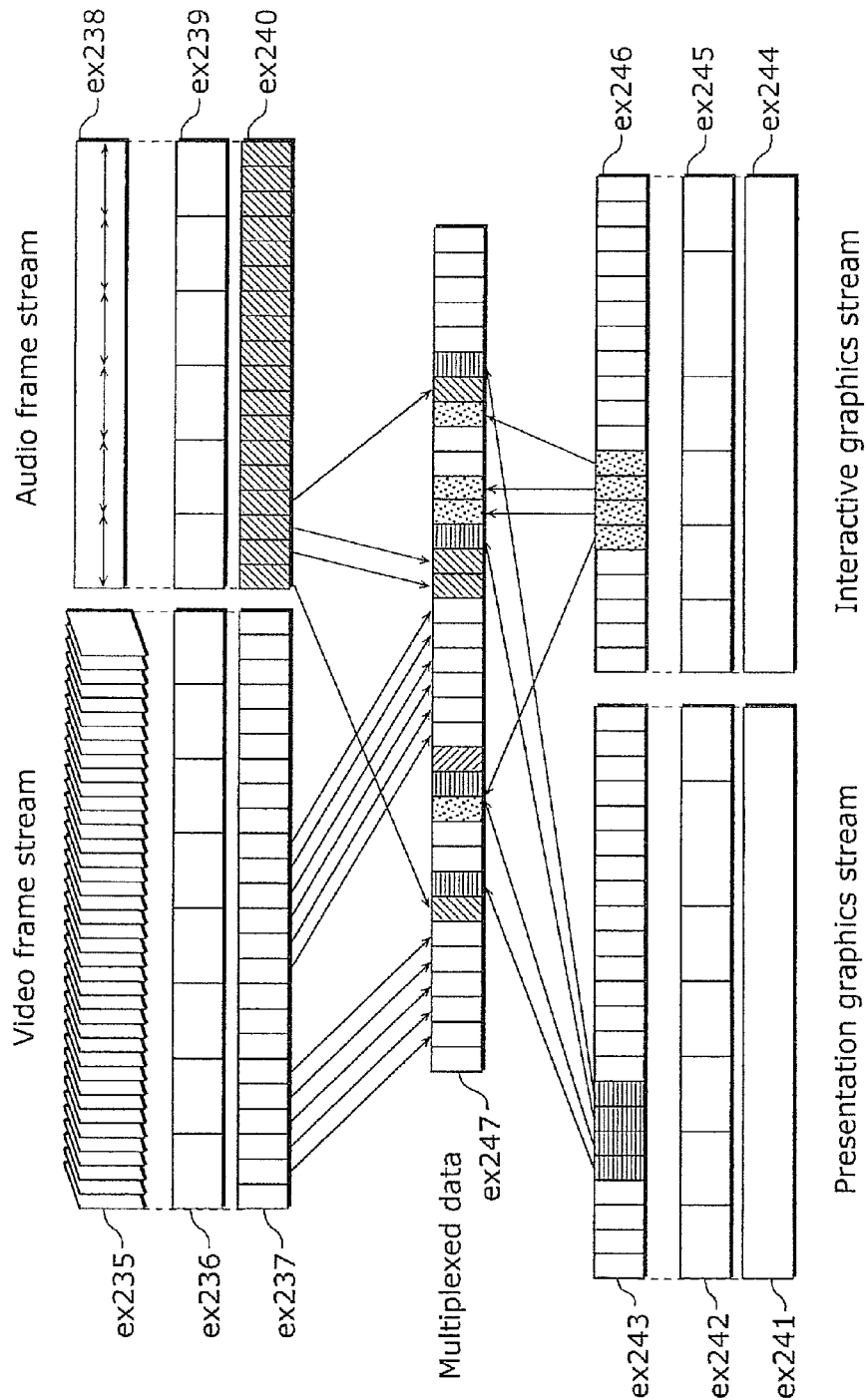
FIG. 17 schematically shows how each stream is multiplexed in multiplexed data.

FIG. 17 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 18:
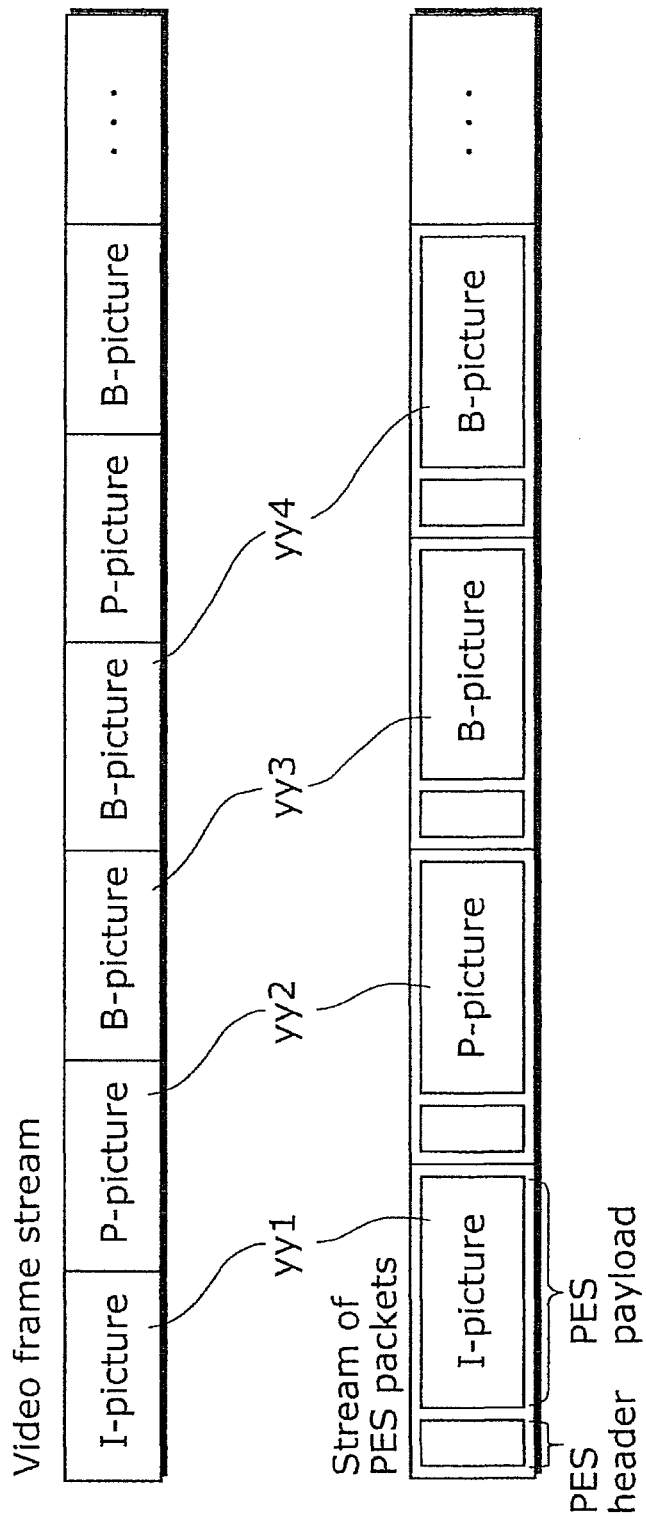
FIG. 18 shows how a video stream is stored in a stream of PES packets in more detail.

FIG. 18 illustrates how a video stream is stored in a stream of PES packets in more detail. The first bar in FIG. 18 shows a video frame stream in a video stream. The second bar shows the stream of PES packets. As indicated by arrows denoted as yy1, yy2, yy3, and yy4 in FIG. 18, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 19 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 19. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 20:
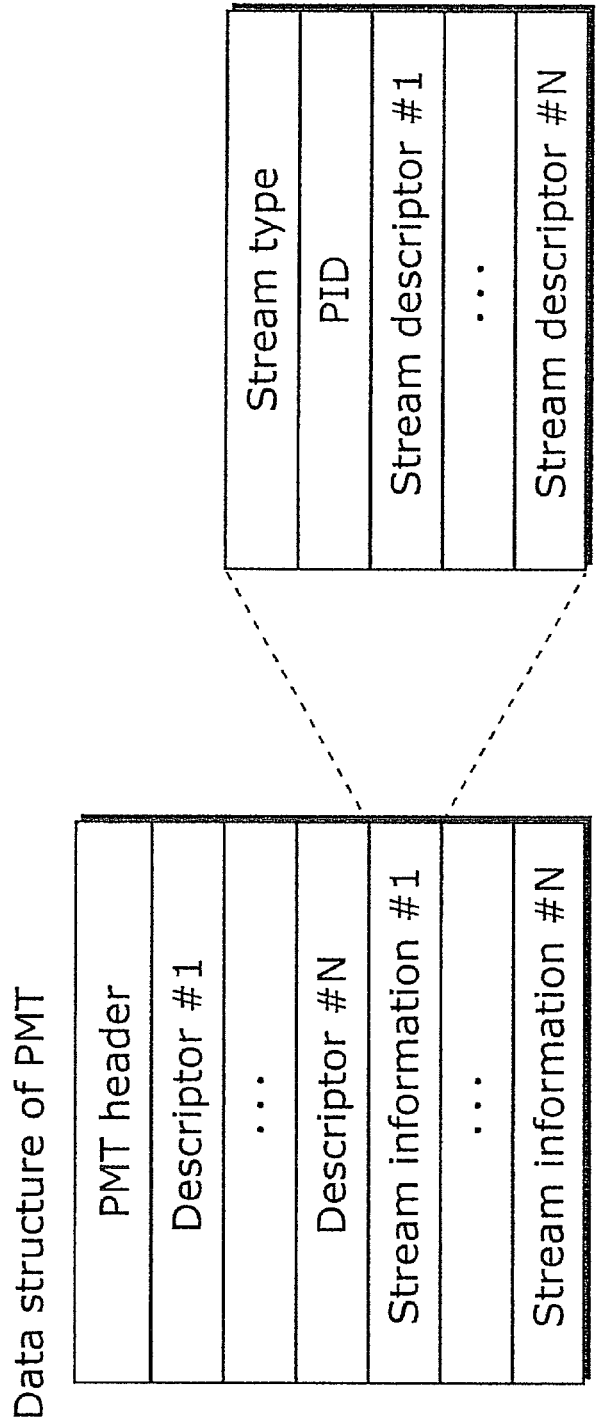
FIG. 20 shows a data structure of a PMT.

FIG. 20 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 21:
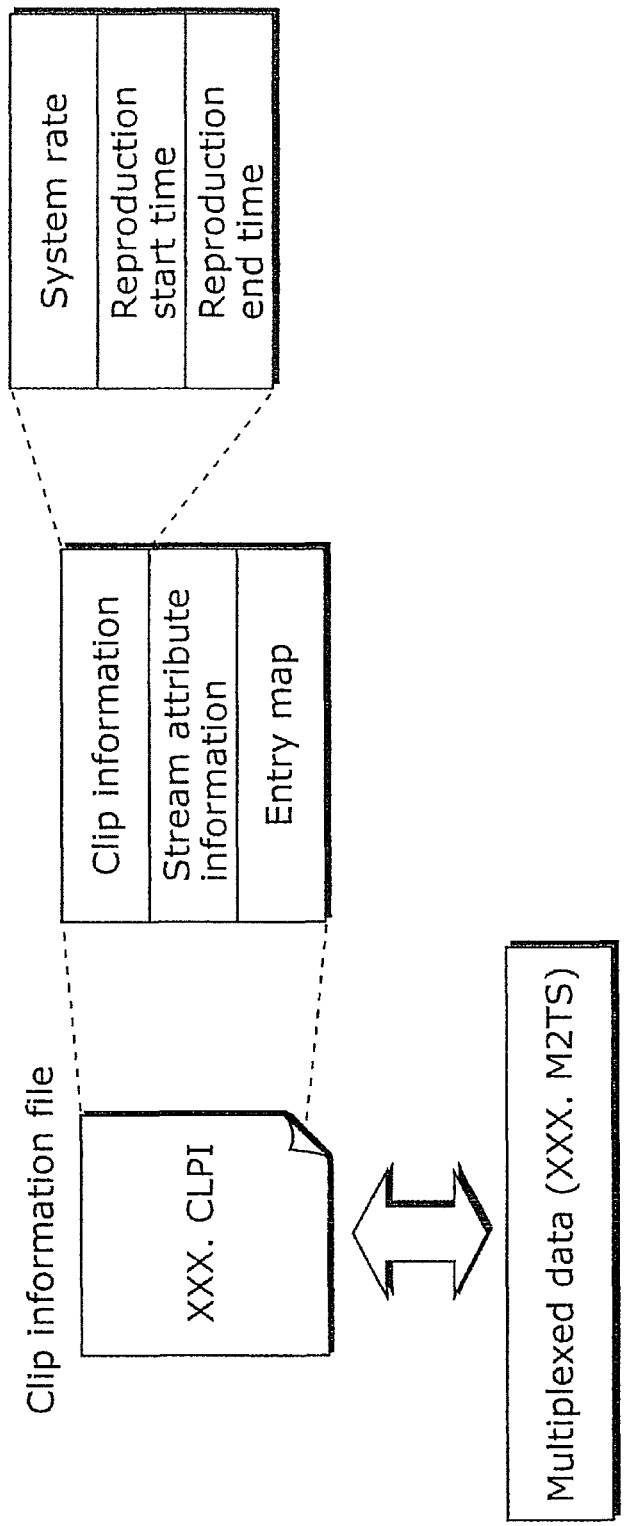
FIG. 21 shows an internal structure of multiplexed data information.

Each of the multiplexed data information files is management information of the multiplexed data as shown in FIG. 21. The multiplexed data information files are in one to one correspondence with the multiplexed data, and each of the files includes multiplexed data information, stream attribute information, and an entry map.

As illustrated in FIG. 21, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 22:
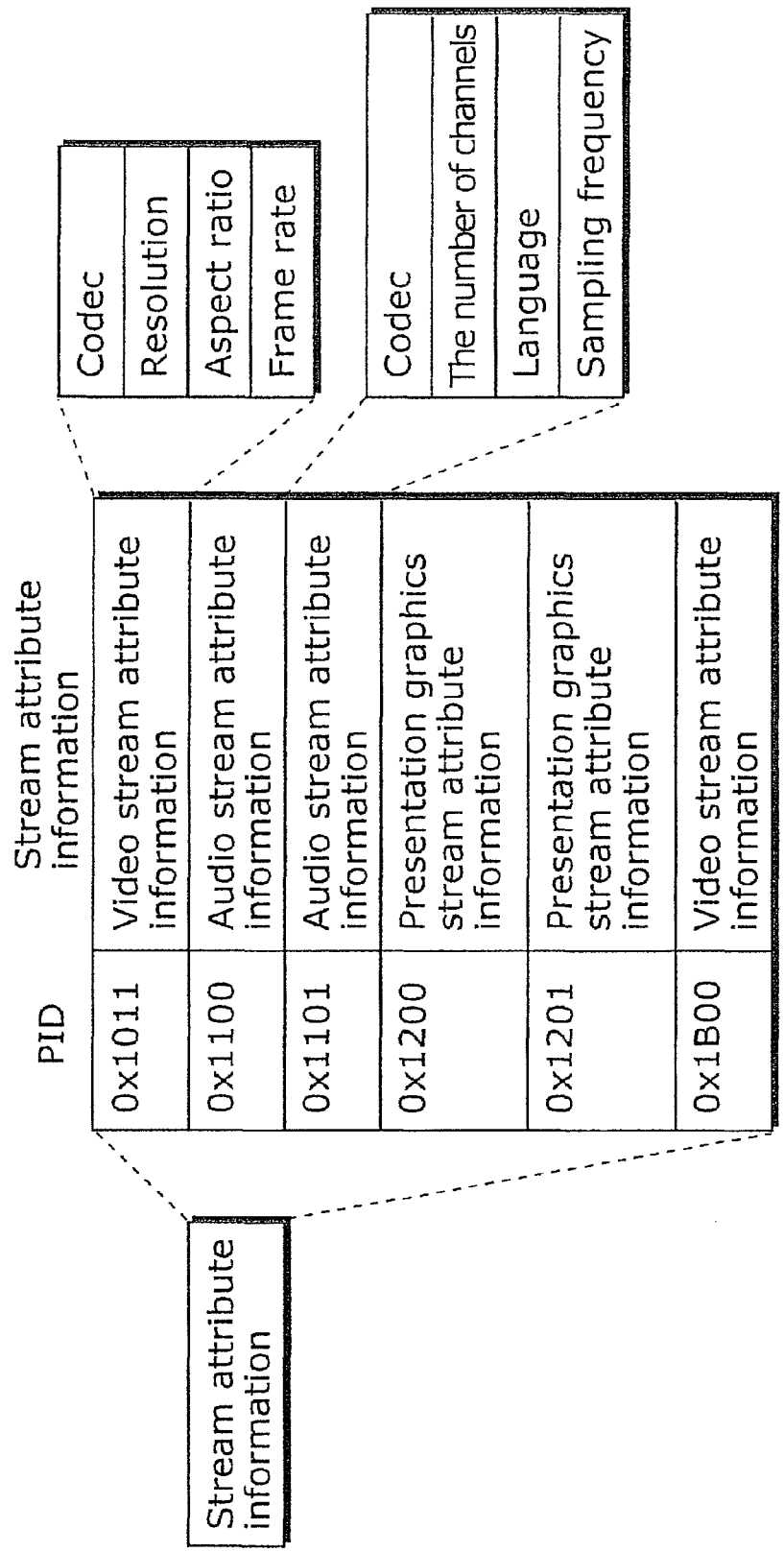
FIG. 22 shows an internal structure of stream attribute information.

As shown in FIG. 22, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 23:
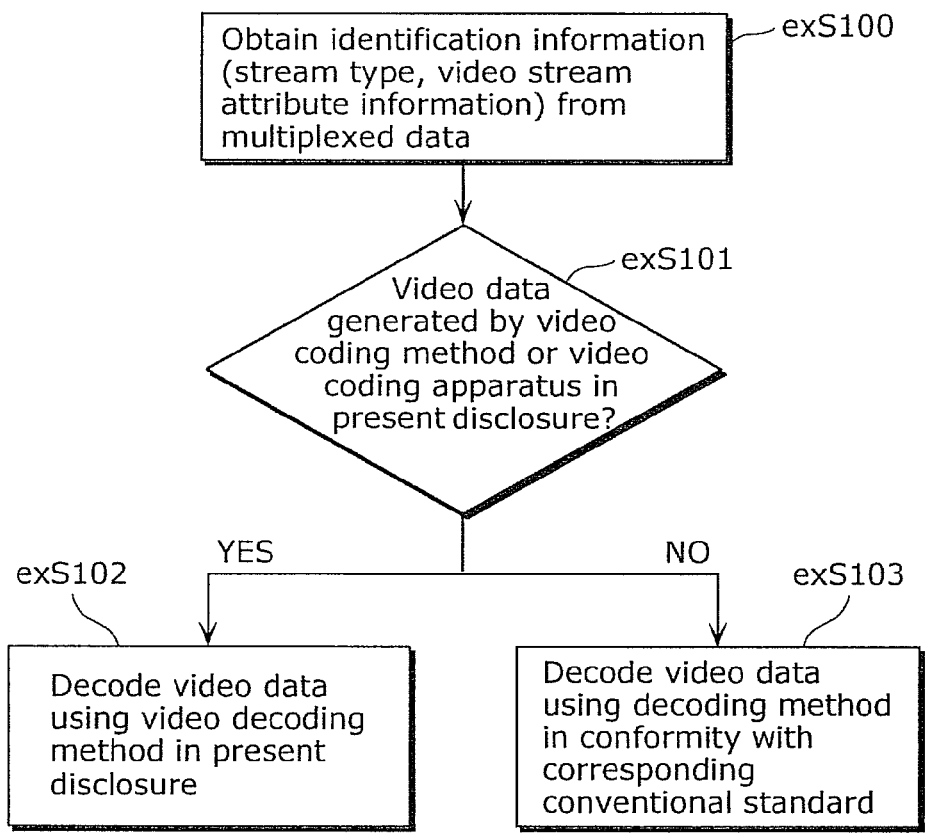
FIG. 23 shows steps for identifying video data.

Furthermore, FIG. 23 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 24:
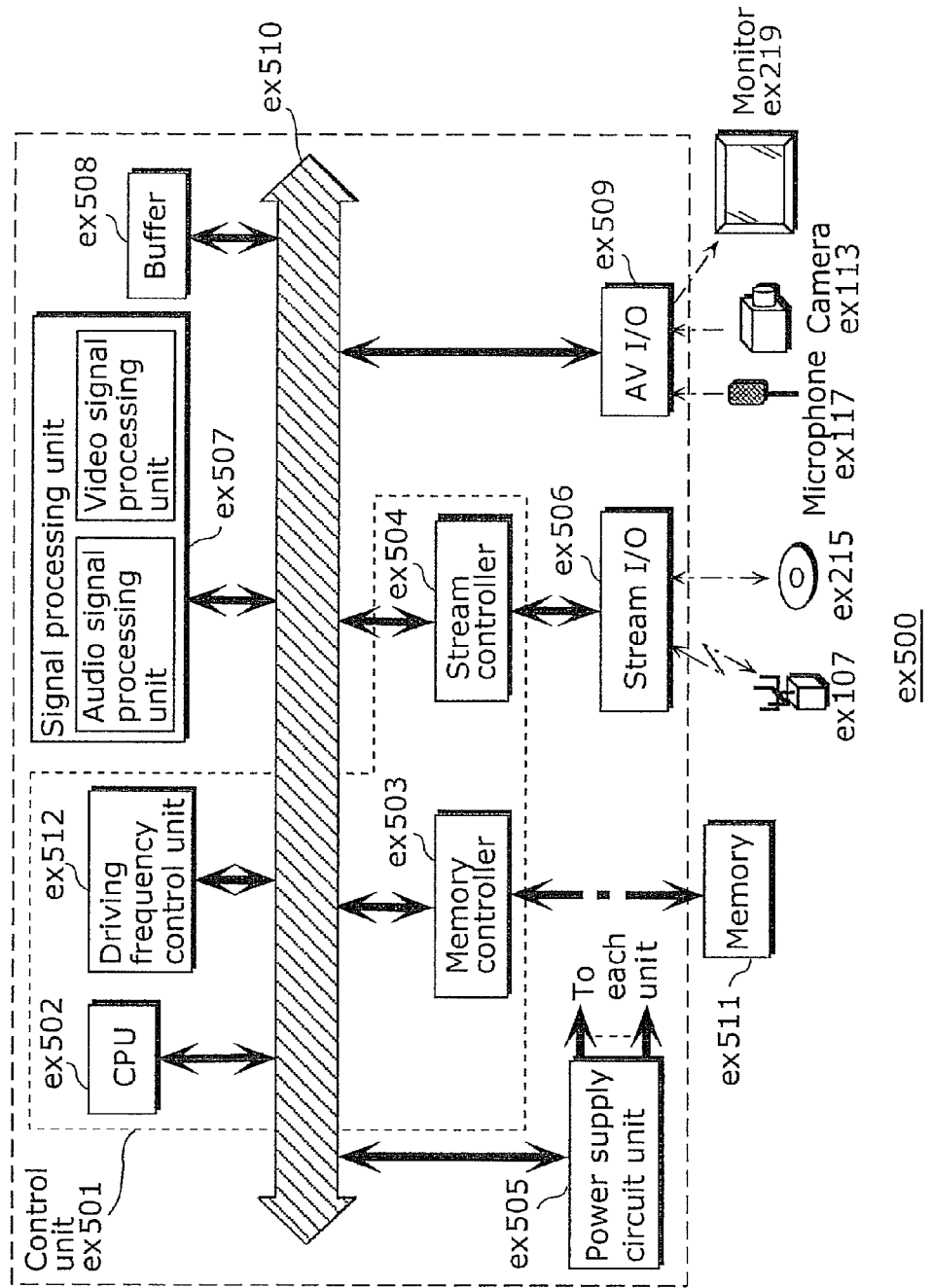
FIG. 24 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 24 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 25:
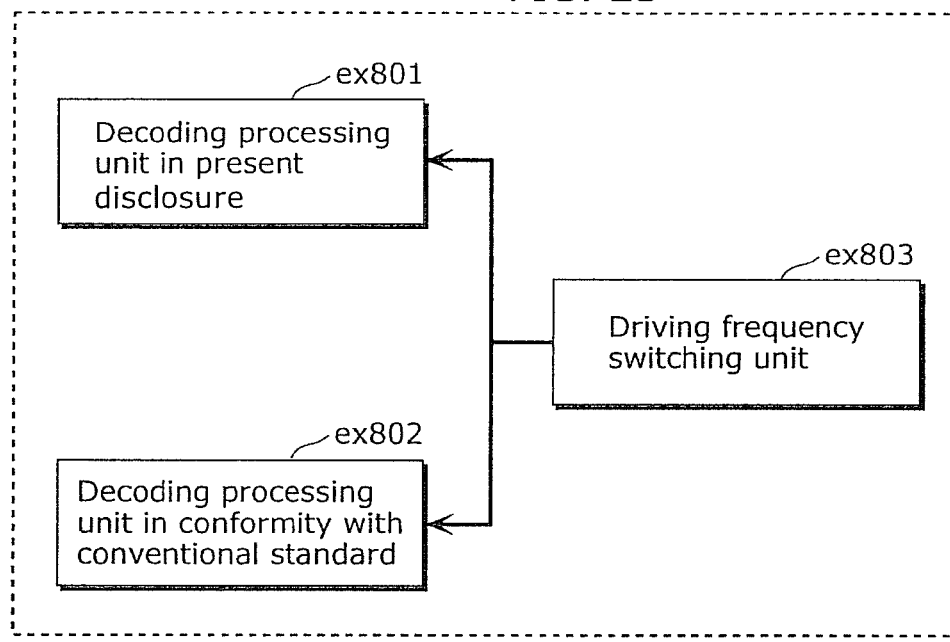
FIG. 25 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 25 illustrates a configuration ex800 in the present embodiment. A driving frequency switching unit ex803 sets a driving frequency to a higher driving frequency when video data is generated by the moving picture coding method or the moving picture coding apparatus described in each of embodiments.

Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

Figures 27, 28A:
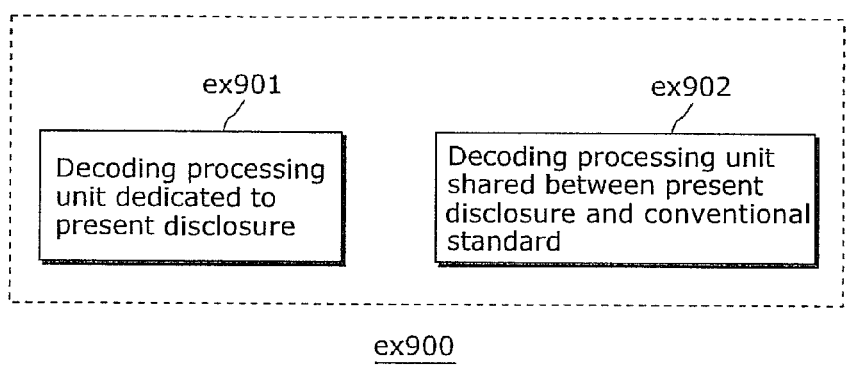
FIG. 27 shows an example of a look-up table in which video data standards are associated with driving frequencies.
FIG. 28A is a diagram showing an example of a configuration for sharing a module of a signal processing unit.

More specifically, the driving frequency switching unit ex803 includes the CPU ex502 and the driving frequency control unit ex512 in FIG. 24. Here, each of the decoding processing unit ex801 that executes the moving picture decoding method described in each of embodiments and the decoding processing unit ex802 that conforms to the conventional standard corresponds to the signal processing unit ex507 in FIG. 24. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 27. The driving frequency can be selected by storing the look-up table in the buffer ex508 and in an internal memory of an LSI, and with reference to the look-up table by the CPU ex502.

Figure 26:
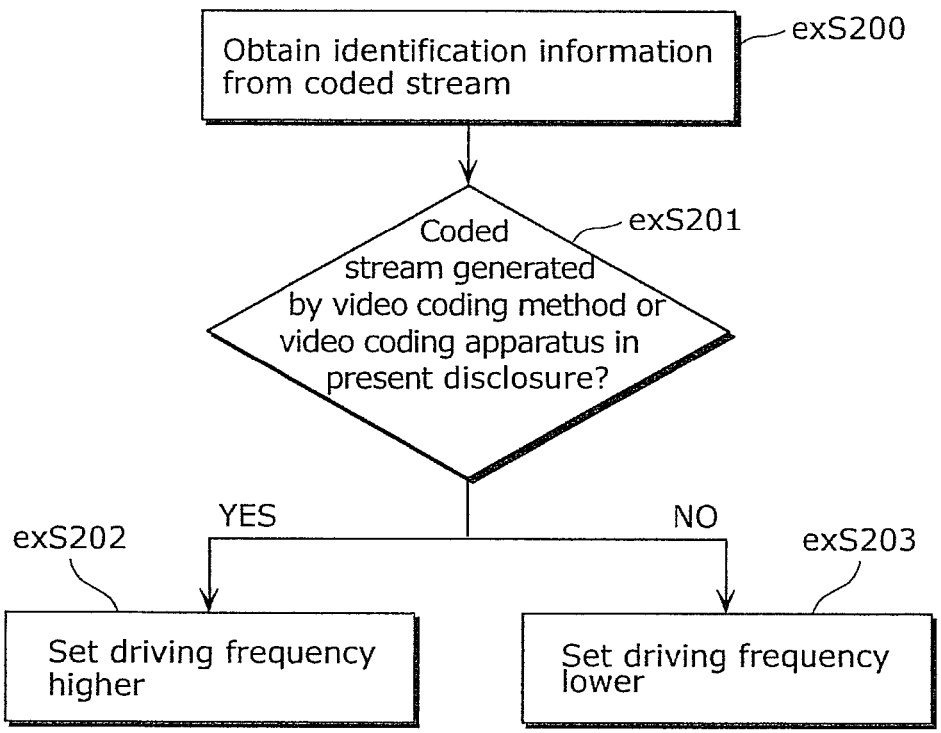
FIG. 26 shows steps for identifying video data and switching between driving frequencies.

FIG. 26 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4

AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 28A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 28B:
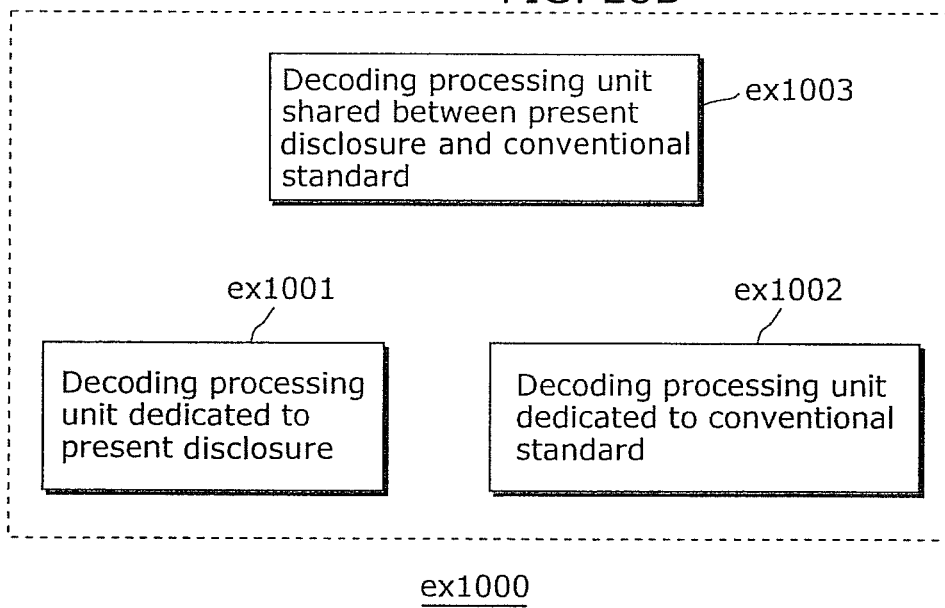
FIG. 28B is a diagram showing another example of a configuration for sharing a module of the signal processing unit.

Furthermore, ex1000 in FIG. 28B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing a video encoding apparatus and a video decoding apparatus according to each of the embodiments is a program described below.

The program causes a computer to execute writing a reference picture set into a header of the bit stream, the reference picture set including a reference identifier of reference pictures, a time identifier, a usage identifier and at least one parameter representing at least one of scale and view; constructing a reference picture list having one or more of the reference pictures; encoding a block of the video from a reference picture associated with a reference index in the reference picture list; and writing the reference index into the bit stream.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The image encoding apparatus and the image decoding apparatus and method according to one or more exemplary embodiments disclosed herein are applicable to television receivers, digital video recorders, car navigation systems, mobile phones, digital cameras, or digital video cameras, for example.

The invention claimed is:

1. A video encoding method for encoding a video into a bitstream, the video encoding method comprising:
   writing a reference picture set into a header of the bit stream, the reference picture set including (i) a time identifier and (ii) at least one parameter representing at least one of scale and view of references pictures;
   constructing, using a processor, a reference picture list having one or more of the reference pictures;
   encoding a block of the video from a reference picture associated with a reference index in the reference picture list; and
   writing the reference index into the bit stream,
   wherein the constructing of the reference picture list includes grouping valid reference pictures into subsets of pictures, each of the subsets of pictures including only pictures having a same view,
   wherein in each of the subsets, the same view of the pictures included in the subset is different from views of pictures included in the other subsets, and
   wherein the same view of the pictures included in at least one of the subsets is different than a current view.

2. The method according to claim 1,
   wherein the constructing of the reference picture list includes:
      selecting the valid reference pictures on the basis of a usage identifier; and
      assigning reference indexes respectively to the reference pictures within each of the subsets in an order that is a function of picture order count.

3. The method according to claim 1,
   wherein constructing the reference picture list includes:
      selecting the valid reference pictures on the basis of a usage identifier and the at least one parameter; and
      assigning reference indexes respectively to the reference pictures within each of the subsets in an order that is a function of picture order count.

4. The method according to claim 1,
   wherein, when the at least one parameter represents scale, the at least one parameter indicates at least one of resolution, time and quality.

5. The method according to claim 1,
   wherein the scale parameter has a 0 or 1 binary value, or an integer value greater than or equal to 0.

6. The method according to claim 1,
   wherein the view parameter has integer values greater than or equal to 0.

7. A video encoding apparatus for encoding a video into a bitstream, the video encoding apparatus comprising one or more processors and storage coupled to the one or more processors,
   wherein the one or more processors is configured to:
      write a reference picture set into a header of the bit stream, the reference picture set including (i) a time identifier and (ii) at least one parameter representing at least one of scale and view of reference pictures;
      construct a reference picture list having one or more of the reference pictures;
      encode a block of the bit stream from a reference picture associated with a reference index in the reference picture list; and
      write the reference index into the bit stream, and
   wherein the reference picture list is constructed by grouping valid reference pictures into subsets of pictures, each of the subsets of pictures including only pictures having a same view,
   wherein in each of the subsets, the same view of the pictures included in the subset is different from views of pictures included in the other subsets, and
   wherein the same view of the pictures included in at least one of the subsets is different than a current view.

8. A video decoding method for decoding a video from a bitstream, the video decoding method comprising:
   parsing a reference picture set from the bit stream, the reference picture set including (i) a time identifier and (ii) at least one parameter representing at least one of scale and view of reference pictures;
   constructing, using a processor, a reference picture list having one or more of the reference pictures;
   parsing a reference index from the video bit stream to select a reference picture associated with the reference index in the reference picture list; and
   decoding a block of the video from the selected reference picture,
   wherein the constructing of the reference picture list includes grouping valid reference pictures into subsets of pictures, each of the subsets of pictures including only pictures having a same view,
   wherein in each of the subsets, the same view of the pictures included in the subset is different from views of pictures included in the other subsets, and
   wherein the same view of the pictures included in at least one of the subsets is different than a current view.

9. The method according to claim 8,
   wherein the constructing of the reference picture list includes:
      selecting the valid reference pictures on the basis of a usage identifier; and
      assigning reference indexes respectively to the reference pictures within each of the subsets in an order that is a function of picture order count.

10. The method according to claim 8,
   wherein constructing the reference picture list includes:
      selecting the valid reference pictures on the basis of a usage identifier and the at least one parameter; and
      assigning the reference indexes to the reference pictures within each of the subsets in an order that is a function of picture order count.

11. A video decoding apparatus for decoding a video from a bitstream, the video decoding apparatus comprising one or more processors and storage coupled to the one or more processors,
   wherein the one or more processors is configured to:
      parse a reference picture set from the bit stream, the reference picture set including (i) a time identifier and (ii) at least one parameter representing at least one of scale and view of reference pictures;
      construct a reference picture list having one or more of the reference pictures;

parse a reference index from the video bit stream to select a reference picture associated with the reference index in the reference picture list; and decode a block of the video from the selected reference picture, and wherein the reference picture list is constructed by grouping valid reference pictures into subsets of pictures, each of the subsets of pictures including only pictures having a same view, wherein in each of the subsets, the same view of the pictures included in the subset is different from views of pictures included in the other subsets, and wherein the same view of the pictures included in at least one of the subsets is different than a current view.

* * * * *